(12) United States Patent  
Siewert

(10) Patent No.: US 9,150,286 B2  
(45) Date of Patent: Oct. 6, 2015

(54) WATER PLATFORM INFRASTRUCTURE AND METHOD OF MAKING

(71) Applicant: ServicePro LLC VA, Reston, VA (US)

(72) Inventor: Neil Siewert, Vancouver (CA)

(73) Assignee: SERVICEPRO LLC VA, Reston, VA (US)

( * ) Notice: Subject to any disclaimer, the term of this patent is extended or adjusted under 35 U.S.C. 154(b) by 0 days.

(21) Appl. No.: 14/209,264

(22) Filed: Mar. 13, 2014

(65) Prior Publication Data

US 2014/0270972 A1    Sep. 18, 2014

Related U.S. Application Data

(60) Provisional application No. 61/778,744, filed on Mar. 13, 2013.

(51) Int. Cl.
*B63B 35/32* (2006.01)
*B63B 35/44* (2006.01)

(52) U.S. Cl.
CPC ......... *B63B 35/32* (2013.01); *B63B 2035/4426* (2013.01)

(58) Field of Classification Search
CPC .................. B63B 35/44; B63B 2035/4426
USPC ............... 405/195.1, 219; 441/47–54
See application file for complete search history.

(56) References Cited

U.S. PATENT DOCUMENTS

| | | | | |
|---|---|---|---|---|
| 2,267 | A * | 9/1841 | Griffith | 441/47 |
| 38,343 | A * | 4/1863 | Tower, Jr. | 441/49 |
| 59,072 | A * | 10/1866 | Raymond | 441/51 |
| 65,792 | A * | 6/1867 | Carson | 441/47 |
| 1,331,034 | A * | 2/1920 | Smith | 441/47 |
| 1,368,935 | A * | 2/1921 | Janecek | 114/68 |
| 1,511,960 | A | 10/1924 | Goldschmidt | |
| 1,743,978 | A | 1/1930 | Quisling | |
| 1,953,964 | A | 4/1934 | Laskowitz | |
| 2,088,115 | A | 7/1937 | Neff | |
| 2,350,248 | A | 5/1944 | Nowlin | |
| 2,807,428 | A | 9/1957 | Wibault | |
| 2,886,976 | A | 5/1959 | Dean | |
| 2,949,550 | A | 8/1960 | Brown | |
| 3,067,967 | A | 12/1962 | Barr | |
| 3,312,425 | A | 4/1967 | Lennon et al. | |
| 3,432,120 | A | 3/1969 | Guerrero | |

(Continued)

FOREIGN PATENT DOCUMENTS

GB    2096268 A    10/1982
IT      312496      11/1933

OTHER PUBLICATIONS

David Hatcher Childress "The Anti-Gravity Handbook" Revised Third Edition—[Sep. 1, 2003], excerpts including "Cover" and pp. 9-24; 38-45; 55-64; 126-128; and 138-139.

*Primary Examiner* — Frederick L Lagman

(74) *Attorney, Agent, or Firm* — Millen, White, Zelano & Branigan, P.C.; William F. Nixon

(57) ABSTRACT

A water habitat platform is created from converted trash and rubbish found within the oceans. A process separates the trash from water to identify the raw materials, which are then converted into building blocks. The blocks are used to create platforms or islands that sustain themselves using power generated from tidal forces. The islands are connected to each other and movable.

6 Claims, 19 Drawing Sheets

(56) References Cited

U.S. PATENT DOCUMENTS

| | | | |
|---|---|---|---|
| 3,626,606 A | 12/1971 | Wallace | |
| 3,662,413 A * | 5/1972 | Andoh et al. | 441/50 |
| 3,964,264 A | 6/1976 | Tornabene | |
| 4,041,716 A * | 8/1977 | Thompson | 405/219 |
| 4,214,720 A | 7/1980 | Desautel | |
| 4,463,667 A * | 8/1984 | Jones | 100/2 |
| 4,481,002 A | 11/1984 | Gargos | |
| 4,683,719 A | 8/1987 | Martinak | |
| 4,770,063 A | 9/1988 | Mundo | |
| 5,213,447 A * | 5/1993 | Srock | 405/219 |
| 5,372,617 A | 12/1994 | Kerrebrock et al. | |
| 5,512,787 A | 4/1996 | Dederick | |
| 6,089,176 A * | 7/2000 | Costello | 405/219 |
| 6,390,729 B1 * | 5/2002 | Dooley et al. | 405/29 |
| 6,520,115 B2 | 2/2003 | Boyd | |
| 6,520,720 B1 | 2/2003 | Boldurev | |
| 7,036,449 B2 | 5/2006 | Sutter | |
| 7,926,438 B2 | 4/2011 | Guerrero | |
| 8,056,554 B2 | 11/2011 | Hinderling | |
| 8,193,651 B2 | 6/2012 | Lightfoot et al. | |
| 8,378,511 B2 | 2/2013 | Sichau | |
| 8,421,263 B2 | 4/2013 | Wilson, Jr. et al. | |
| 8,471,396 B2 | 6/2013 | Roddier et al. | |
| 2008/0018114 A1 | 1/2008 | Weldon | |
| 2012/0267949 A1 | 10/2012 | Sharon et al. | |
| 2013/0099496 A1 | 4/2013 | Solheim | |
| 2013/0140821 A1 | 6/2013 | Sapir | |

* cited by examiner

WATER PLATFORM INFRASTRUCTURE AND METHOD OF MAKING

FIELD OF THE INVENTION

The present invention relates to a platform for use in a water environment, such as an ocean. More particularly, the present invention relates to a platform infrastructure for use in an ocean environment that is built and powered using resources from the ocean.

BACKGROUND OF THE RELATED ART

It is known that a large accumulation of trash and debris has accumulated in the oceans of the world. Especially in the Pacific Ocean, large areas of trash have built up within one or more gyres. A gyre is a large system of rotating currents. Trash and debris are trapped within the gyres and then amassed in a vortex. The problem impacts all of us because the detrimental effect on the ocean ecosystem. Toxic chemicals and the breakdown of plastics or other rubbish exacerbates this problem as sea life ingests these chemicals. This act either kills the sea life or ends up on our dinner table.

Looking at another topic, several instances of floating platforms for all season ocean use have been proposed. For example, large ocean-going vessels may provide living quarters year around for residents. Other examples include artificial islands and parks that cater to an exclusive crowd. These floating islands and large ships also will produce a large amount of trash, debris and rubbish, thereby contributing to the problems discussed above. None of these proposed platforms address the need to reduce waste accumulating in the oceans.

SUMMARY OF THE INVENTION

The disclosed embodiments of the present invention relate to a marine aquatic habitat that is mobile and has propulsion. The habitat should create and supply its own power. The habitat may be a platform or infrastructure stationed at a location, or can maintain its position through adjusted propulsion. It also can be locked into position by coupling with a pinion to receive or provide power or data. The marine aquatic habitat may form a chain or network of other habitats that configured to communicate as a group or network. For example, cables may run between the habitats.

The disclosed habitats may include a platform that converts or forms the floating debris, garbage and rubbish in the oceans into building blocks used within the infrastructure of the platform. An apparatus for collecting and converting the floating rubbish allows the platform to build on itself. Thus, while building the platform, the disclosed embodiments will reduce the noxious waste forming within the oceans. The benefits of this process are immeasurable with regards to saving and preserving vital ecosystems and food sources linked globally.

The disclosed embodiments also have land-based applications. Currently, landfills accept refuse and do nothing with it. The disclosed embodiments may convert this refuse into the building blocks then used in the ocean platforms, or in bridges or other structures linked with the platforms.

BRIEF DESCRIPTION OF THE DRAWINGS

The accompanying drawings are included to provide further understanding of the disclosed embodiments and constitute a part of the specification. The drawings listed below illustrate embodiments of the claimed invention and, together with the description, serve to explain the principles of the invention, as disclosed by the claims and their equivalents.

DESCRIPTION OF THE PREFERRED EMBODIMENTS

Figure 1:
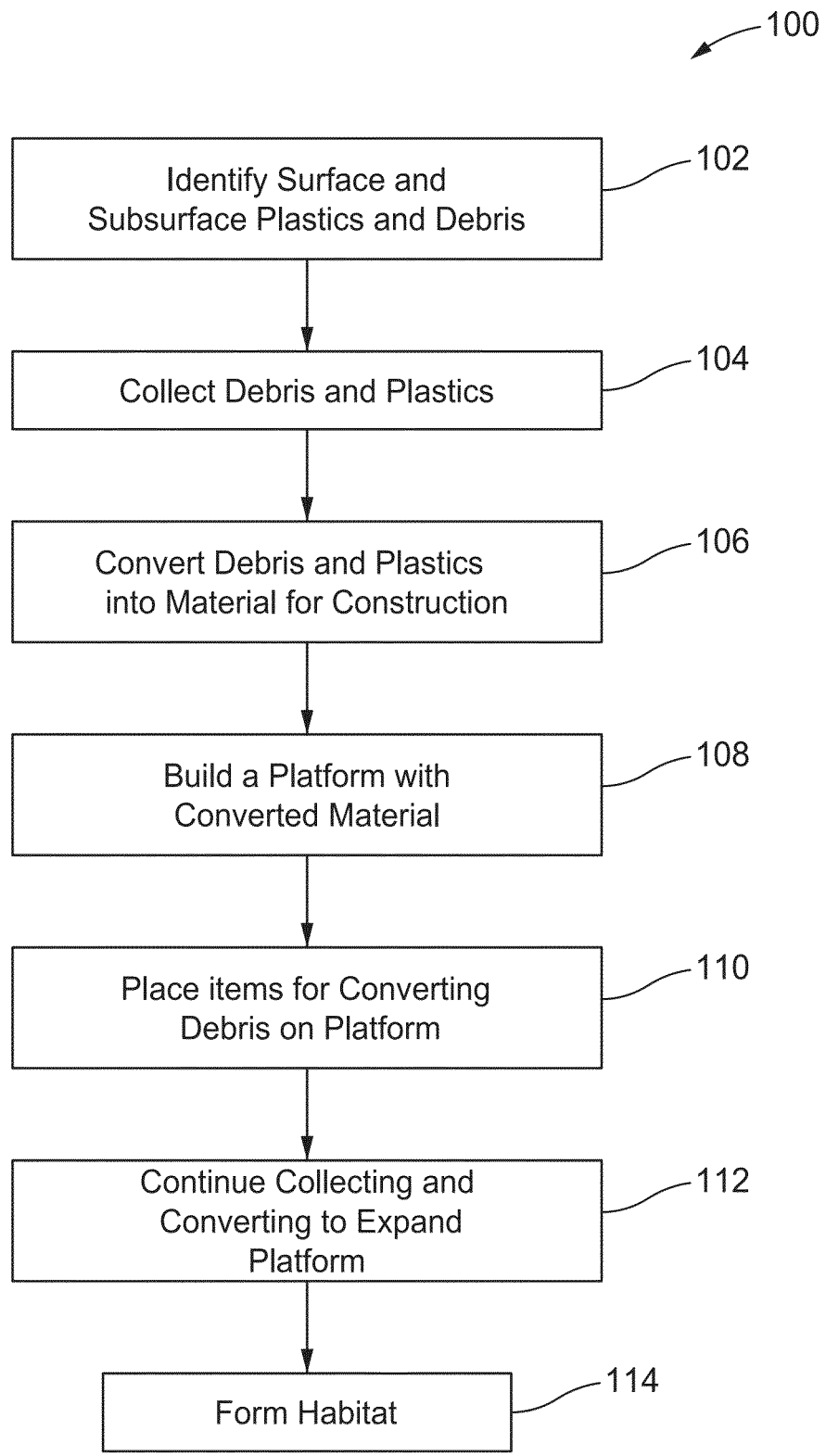
FIG. 1 illustrates a flowchart for a process of creating a marine habitat platform according to the disclosed embodiments.

Aspects of the invention are disclosed in the accompanying description. Alternate embodiments of the present invention and their equivalents are illustrated without parting from the spirit or scope of the present invention. It should be noted that like elements disclosed below are indicated by like reference numerals and the drawings.

FIG. 1 depicts a flowchart 100 for a process of creating a marine habitat platform according to the disclosed embodiments. The disclosed process may use pools of water fed from the ocean that flow through a device configured to perform the process. Step 102 executes by identifying surface and subsurface plastics and debris in the gyres. Subsurface plastics are included in order to increase the depth of searching for garbage below the surface. Step 104 executes by collecting the debris and plastic. Step 106 executes by converting the collected debris and plastics into material for construction, or other uses. This material may be in the form of a block or section that is placeable with other materials to form structures.

Step 108 executes by building a platform with the converted material, wherein the platform is floatable. The material also may be treated to not be corrosive in a salt water environment. Step 110 executes by placing the means or device for forming the building material on the platform. Until this step, the device for converting the garbage into the building material may be on a ship or other structure located in an ocean environment. Step 112 executes by continuing the collecting and conversion of debris and plastics to keep expanding the platform. Step 114 executes by forming a habitat on the platform. The habitat includes residential/lodging for recreation and work, arable land, buildings and the like. Preferably, the water habitat platform becomes a community.

Figure 2:
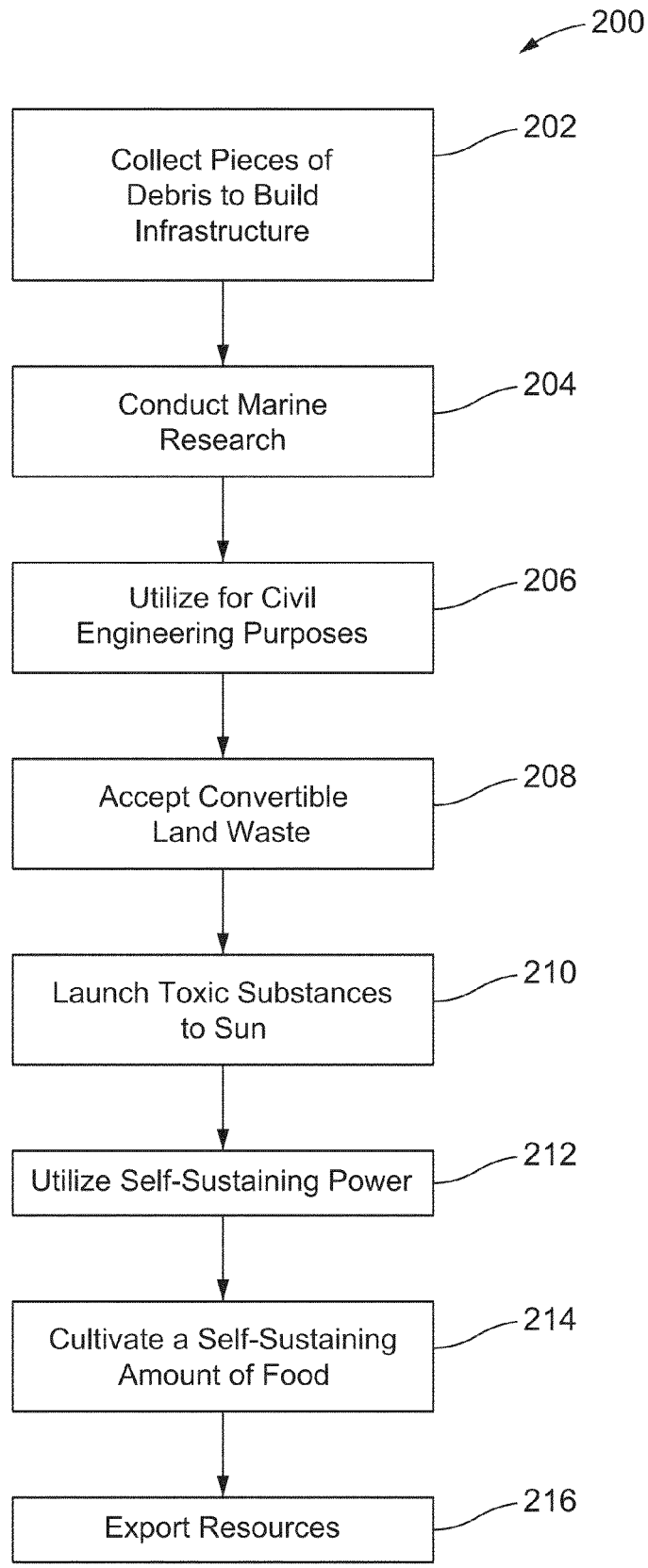
FIG. 2 illustrates a flowchart for a process using a water habitat platform according to the disclosed embodiments.

FIG. 2 depicts a flowchart 200 for a process using a water habitat platform according to the disclosed embodiments. Flowchart 200 illustrates some of the activities that a water habitat platform can do once established. This list is not exhaustive.

Step 202 executes by collecting additional debris and plastics to build infrastructure. This infrastructure may be the platform itself or additional platforms. In other words, if a water habitat platform already is self-sustaining, then it may use the disclosed embodiments to begin constructing another platform. Once complete, the second platform may move apart from the initial platform. These platforms may be connected, and the expansion continues until several platforms are connected to form a polis or entity.

Step 204 executes by conducting marine research at the water habitat platform. Step 206 executes by utilizing the position of collection and growth for civil engineering purposes, such as the building of continental bridges or other structures. Step 208 executes by accepting convertible land waste for expansion. Hopefully, the waste in ocean is collected or reduced to negligible amounts. If so, then land waste may be used to form the building materials of the disclosed embodiments.

Step 210 executes by launching toxic substances generated during the conversion process away from the water habitat platform. Such materials may include radioactive substances, chemicals, or waste from the conversion process. These substances may be launched towards the sun. By using the platform, the danger of exploding such materials over land or population may be avoided.

Step 212 executes by utilizing self-sustaining power through tide, solar or wind energy. These forces may be harnessed to generate power for the platform. Preferably, the platform does not require outside sources of energy once an independent entity. The power also may be generated through the use of magneto-dynamics. Step 214 executes by cultivating a self-sustaining amount of food at the platform. Soil and other materials for growing plants may be placed on the platform and used. Further, plants and organisms that live in salt water may be cultivated. Step 216 executes by exporting any excess resources from the water habitat platform. Thus, the platform becomes a producer of goods and resources instead of devourer.

A number of platform-based large ships may move to the area comprising the garbage and debris within the ocean. These vessels should carry the recycling conversion apparatus. The conversion apparatus would be used to melt down and form the pieces used to construct the platform. The apparatus would be loaded onto the platform, and the process repeated. Additional pieces of the platform may be created and added as desired.

Figure 3:
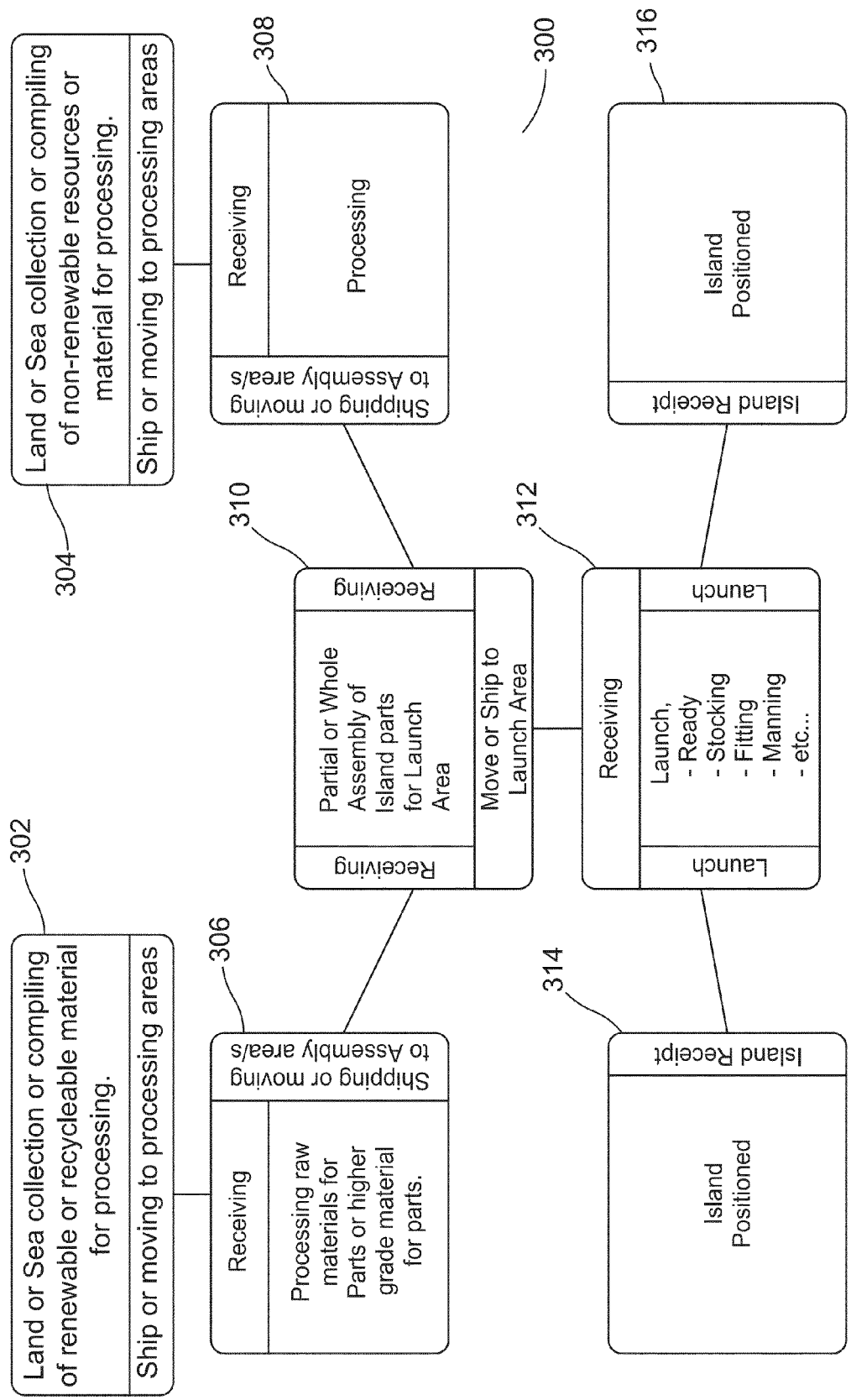
FIG. 3 illustrates a production line diagram for creating a water habitat platform according to the disclosed embodiments.

FIG. 3 depicts a production line process flow diagram 300 for creating a water habitat platform according to the disclosed embodiments. Due to the composition of the sea, and the eventual demise of most materials when exposed to air and salt water, the disclosed embodiments will maintain longevity by composing the outer structure with a polymer shell or exoskeleton for its parts, whether moving or non-moving. Fibers, such as carbon fibers or glass fibers, also may be used. The parts comprising the whole will make a water and element-proof platform. The polymer materials, and other materials such as metals and the like, can come from non-renewable earth processing like oil and mineral extraction. These materials also can come from renewable materials such as plant or biomass matter, as well as recycled materials gathered for processing.

Thus, the water habitat platform and its mechanical structures for sustaining habitation are protected by a polymer shell so as not to be contaminated by corrosive substances. FIG. 3 shows the process diagram for putting together these materials to create a platform according to the disclosed embodiments.

Step 302 executes by collecting renewable or recyclable materials from the ocean found as floating debris, as disclosed above. Step 302 also includes collecting renewable or recyclable materials from places like dumps, recycling stations, trash pickup, trash points of origin like apartment garbage shoots or household pickup, trash compactors, disaster cleanup, demolitions, and the like. Basically, any place may be used having recyclable materials. Step 302 also includes renewable resources. Thus, step 302 could include the cultivation of plantations, farms or other plant material for use in the processing and production of the disclosed platforms, or islands. Step 302 also includes shipping or moving these items to the processing area or device.

Step 304 executes by collecting non-renewable or non-recyclable materials from the ocean found as floating debris, as disclosed above. Step 304 also includes collecting non-renewable or non-recyclable materials from the same places listed in step 302 as well as sources from drilling and mining. Waste or scrap from industrial operations also may be used.

Step 306 executes by processing the raw materials collected in step 302 for parts or higher grade material used for parts. Processing may include refining the raw materials, melting/heating operations or the smelting of metals. Step 306 also executes by shipping or moving these finished parts to assembly areas. Preferably, the finished parts are blocks for use in the water habitat platforms. Step 308 may execute the same functions as step 306, except for the materials collected in step 304.

Step 310 executes by partially or wholly assembling the island, or platform, from the finished parts. For example, blocks of finished material may be combined together to create sections of the platform. Step 310 also executes by receiving the finished parts and moving the assembled sections to a launch area.

Step 312 executes by launching the assembled sections within an area. A portion the already functioning island may be selected for the launch area. The sections are brought to this area. At this time, other operations may be performed, such as stacking, fitting, and the like. Steps 310 and 312 may be combined.

Step 314 executes by positioning the island section as desired. If the section is part of an existing platform, or island, then step 316 executes by positioning this section in conjunction with the existing platform. These steps also include providing a receipt for receiving the section or island.

As disclosed above, the water habitat platform or island may generate its own power. FIGS. 4-8 illustrate such a power generating assembly for use within an oceanic environment. The disclosed power generator may use an encapsulated maglev propulsion sleeve with magnets positioned within the sleeve. The magnets suspend, direct and move a secondary interior unit/apparatus within the sleeve.

The secondary unit includes an apparatus and the features to create charged ions when passing by the apparatus or the features embedded within the sleeve wall. The sleeve wall also includes the apparatus or the features for collection of the charged particles. The sleeve wall further includes the apparatus or the features for multidirectional disbursement to MPS magnets and secondary power outlets, station(s), storage unit(s) for secondary purposes, and the like.

In another embodiment, the encapsulated sleeve is arranged like a matrix of magnetic material built into the sleeve wall. The magnetic material receives an external charge to interact and ping the matrix of magnets with charged particles in an arrangement that creates more charged particles than were dispersed by the original discharge. The sleeve also includes an apparatus or features built into its wall for the collection of surplus charged particles. The sleeve wall includes the configuration or features built into the wall to redistribute surplus energy to an external charge apparatus or direct to a wall ping matrix. The redistribution apparatus and its features direct the surplus energy in addition to that energy being fed to the wall ping matrix to secondary power outlets, stations, storage units, capacitors, and the like, for secondary purposes.

Figure 4:
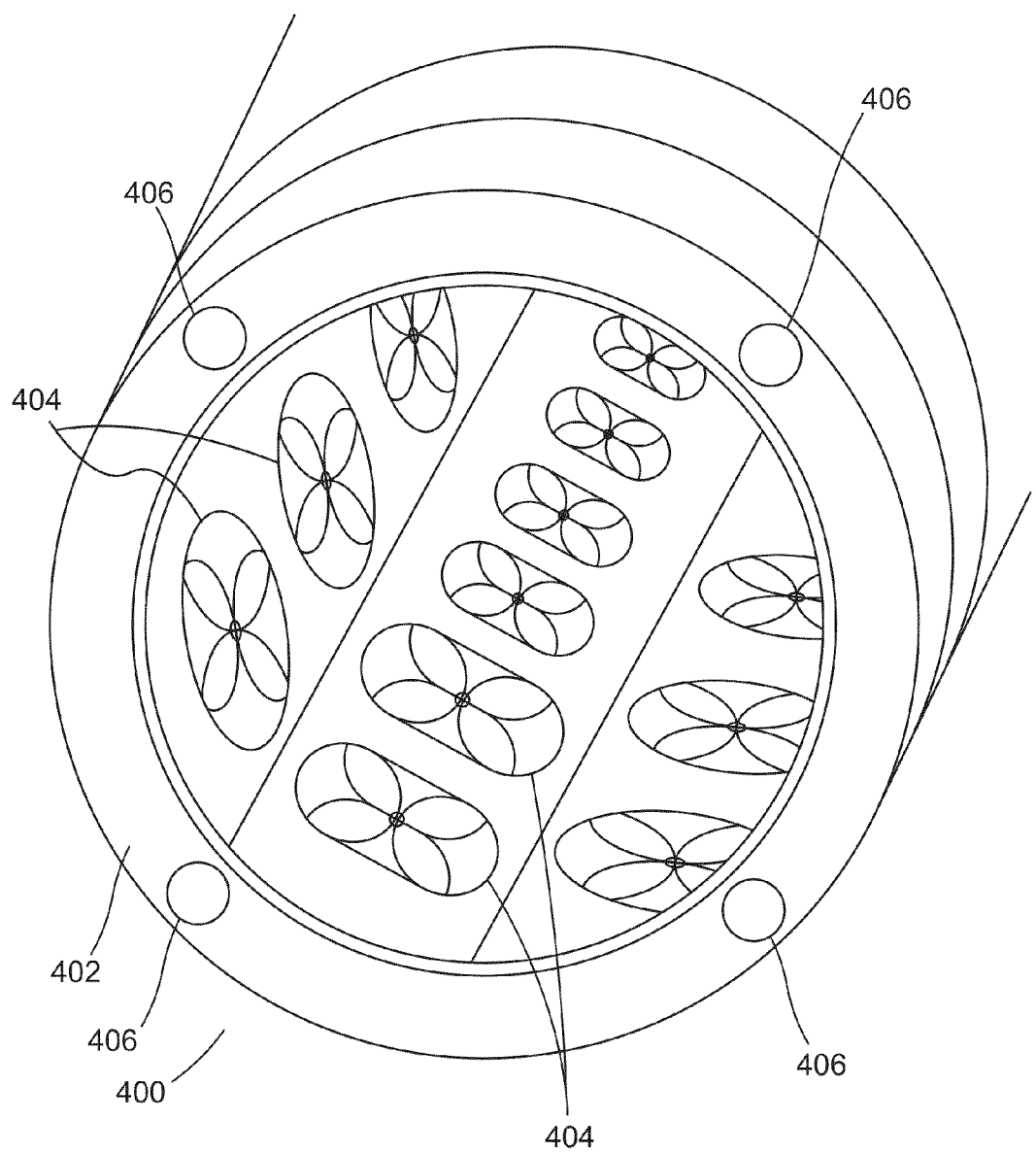
FIG. 4 illustrates s an annulus/sleeve with magnetic or charged particle disbursement mechanisms according to the disclosed embodiments.

FIG. 4 depicts an annulus/sleeve ("sleeve") 400 with magnetic or charged particle disbursement mechanisms 404 according to the disclosed embodiments. As can be seen, a plurality of particle disbursement mechanisms 404 lines wall 402 of sleeve 400. Preferably, the particle disbursement mechanisms 404 are inlaid into wall 402. Energy relays 406 may act as cables extending parallel or along an axis created by the center of sleeve 400. Preferably, the cables are flexible to bend with sleeve 400, but can provide stability within the sleeve. Energy relays 406 may direct energy away or to collection points, or further to the magnetic propulsion apparatus within the sleeve.

Figure 5:
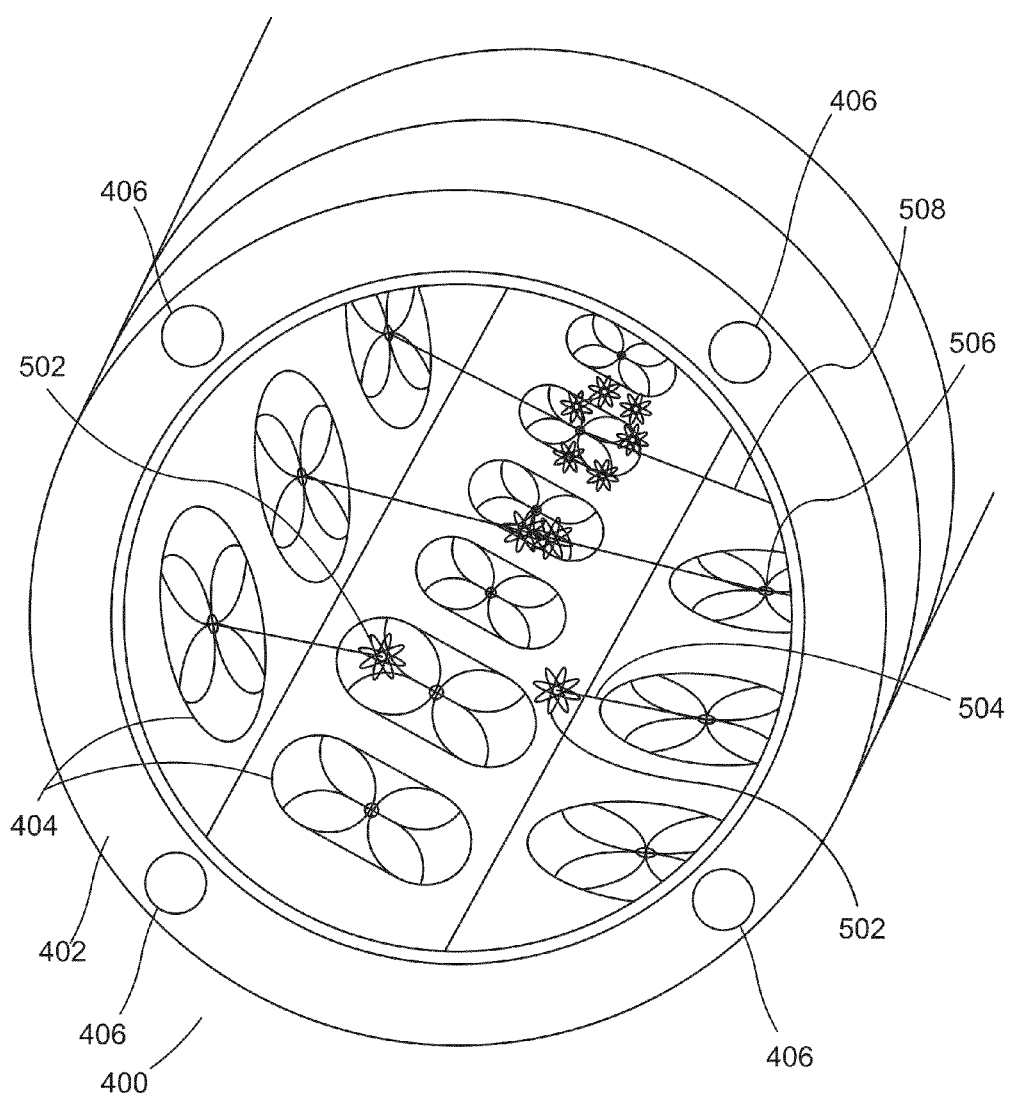
FIG. 5 illustrates the pathways for the charged particles within the sleeve according to the disclosed embodiments.

FIG. 5 depicts the pathways for the charged particles within sleeve 400 according to the disclosed embodiments. Particle disbursement mechanisms 404 may eject particles 502 along a line towards the opposite mechanism within wall 402. FIG. 5 shows the results of the ejection. Path 504 shows particles 502 moving towards each other from particle disbursement mechanisms 404. Path 506 shows particles 502 colliding together. Path 508 shows the results after the collision of particles 502, wherein more particles are created by the disclosed process.

Figure 6:
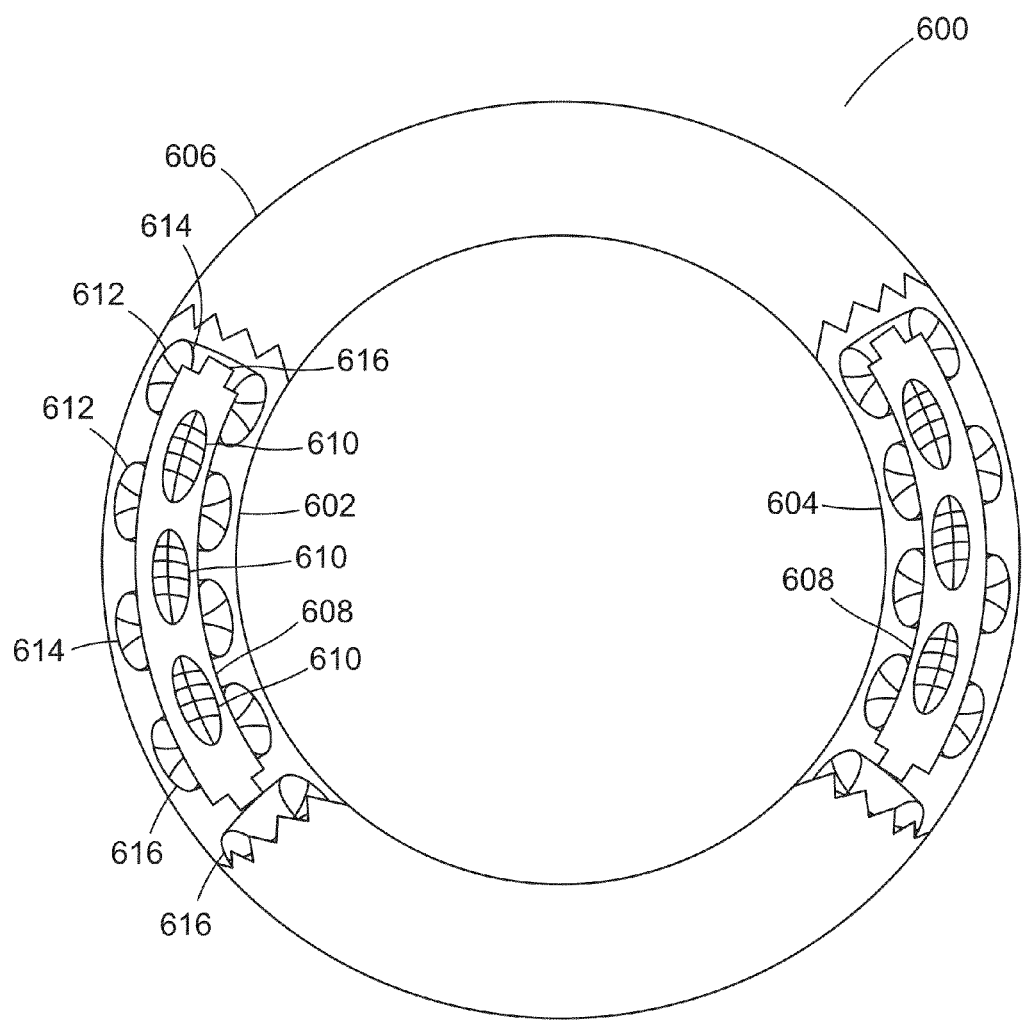
FIG. 6 illustrates a top down view of a power generator according to the disclosed embodiments.

FIG. 6 illustrates a top down view of a power generator 600 according to the disclosed embodiments. Power generator 600 may be known as an Encapsulated MagLev Power Generator, or EMLPG™. Power generator 600 includes two cutaway views 602 and 604 in sleeve 606. Sleeve 606 may correspond to sleeve 400 disclosed above. Apparatus 608 is contained within the wall(s) of sleeve 400, and moves or circles within the wall. Apparatus 608 may be known as a Particle Inducer Piston, or PIP™.

Referring to cut-away view 602, apparatus 608 includes magnets 610 that interact with magnets within sleeve 606 to propel the PIP. While moving, apparatus 608, or PIP, passes particle interaction mechanisms 612 that also collect charged particles created by the movement. Particle interaction mechanisms 612 may operate like particle interaction mechanisms 404 disclosed above.

Collection wires 614 are inside each particle interaction mechanism 612. Collection wires 614 extend from the edges of particle interaction mechanism 612 to node point(s) 614 for the collection of charged particles. Thus, a particle interaction mechanism 612 interacts with a particle interaction mechanism 404 inlaid in wall 402. Thus, particles may be collected as apparatus 608 moves.

Figure 7:
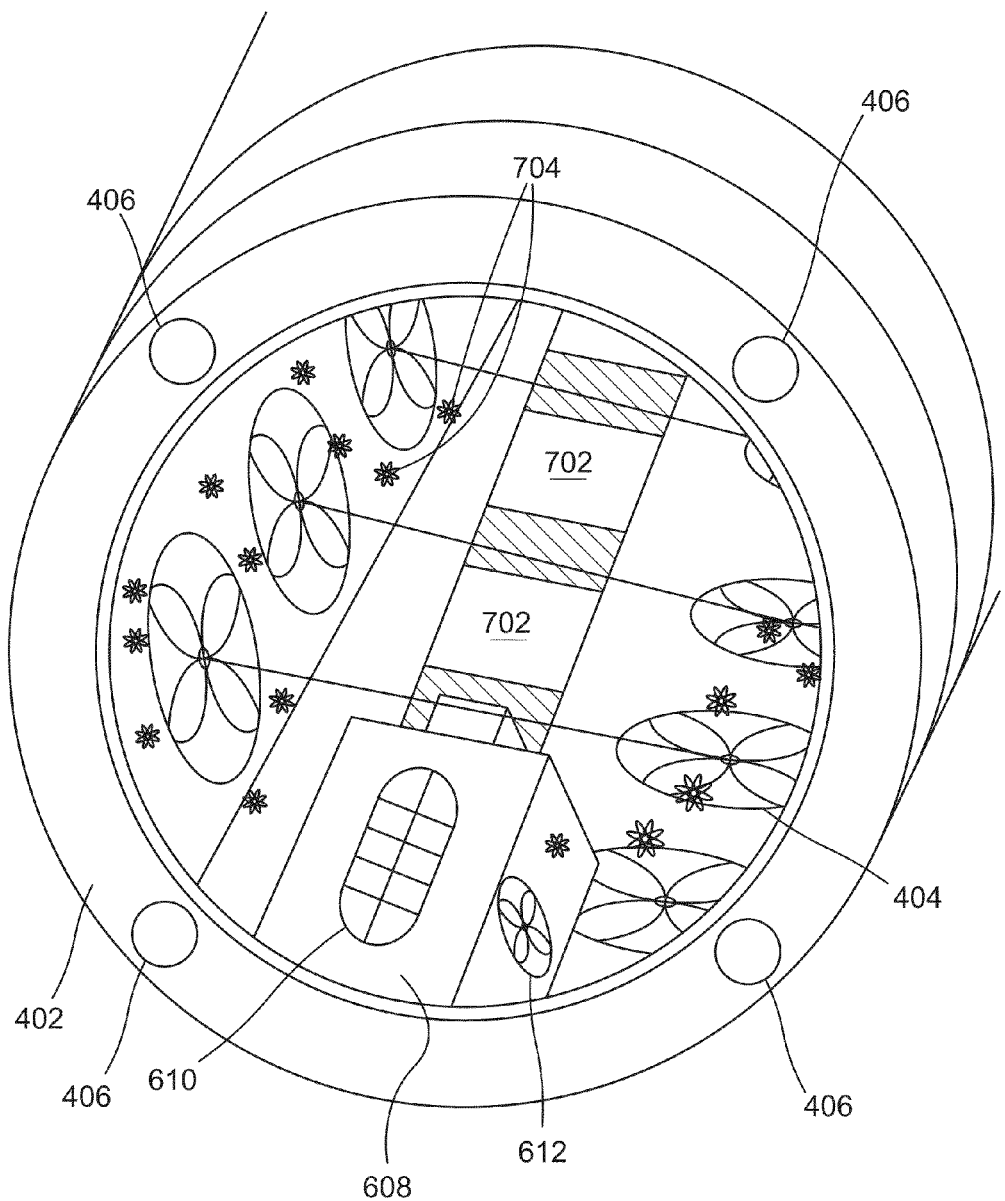
FIG. 7 illustrates an apparatus passing through the power generator according to the disclosed embodiments.

FIG. 7 depicts an apparatus 608, or PIP, passing through power generator 600, or EMPLG, according to the disclosed embodiments. Charged particles 704 travel towards the collector wires in the particle interaction mechanisms as apparatus 608 passes. Magnets 702 propel the PIP. Magnets 704 also may be located on the upper side of annulus 600 to interact with magnets 610. Magnets 704 and magnets 610 serve to suspend the PIP within the annulus.

Referring back to FIGS. 4 and 5, particle interaction mechanisms 612 may be included in sleeve 402 and particle disbursement mechanisms 404 may still interact as disclosed above. Paths are created where particles collide and are collected by particle interaction mechanisms 612. In other words, apparatus 608 is not run through generator 600.

Figure 8:
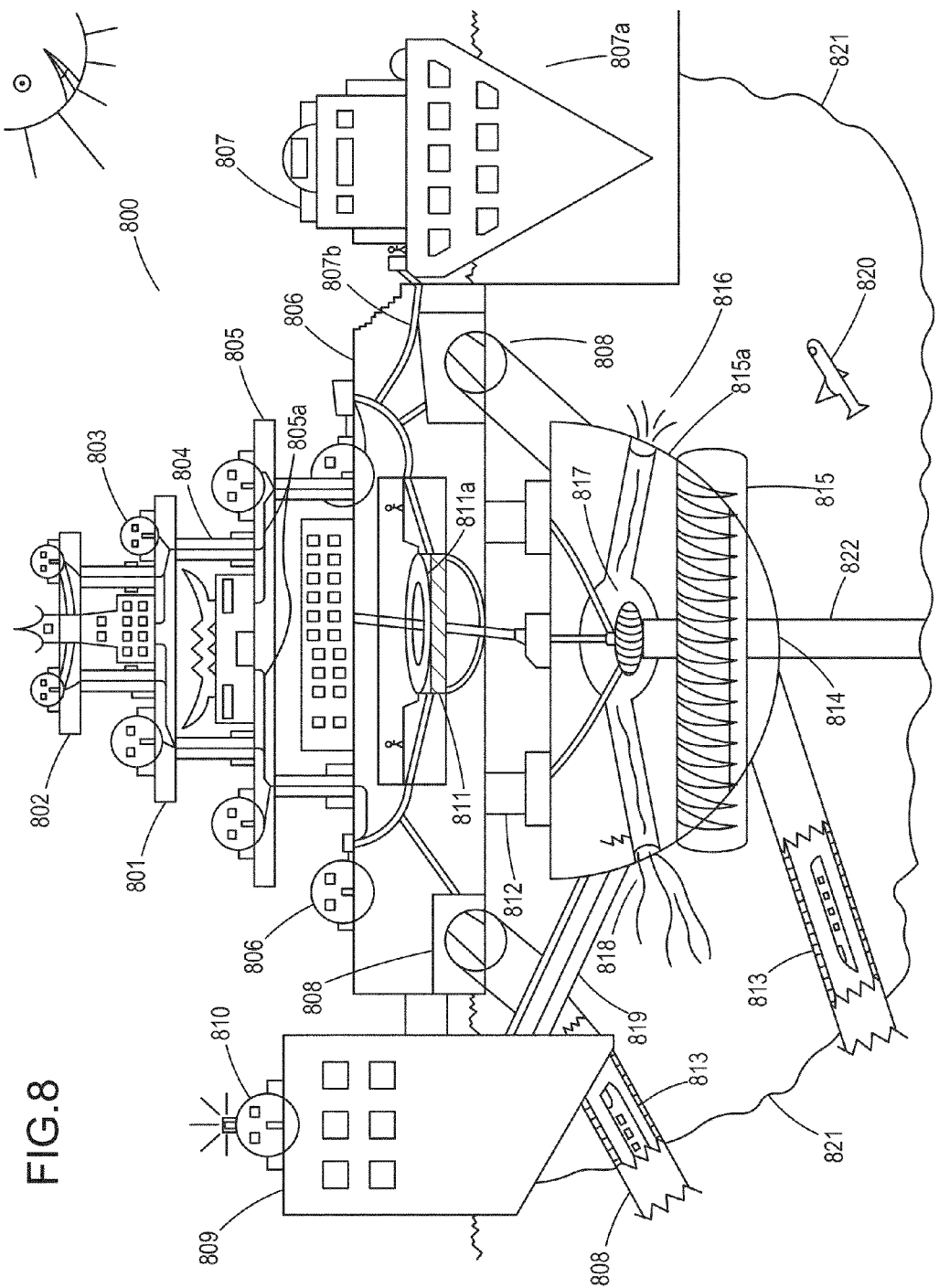
FIG. 8 illustrates an island according to the disclosed embodiments.

FIG. 8 depicts an island 800 according to the disclosed embodiments. Island 800 may be comprised of the building materials composed of collected and converted debris, as disclosed above. The platform is built in the ocean and then improved to provide the following features on the island in order to improve living conditions and sustainability.

Floor 801 is the third floor of the island complex, and includes the government or administration housing and offices for the island compete with two escape pods. Escape pods are disclosed in greater detail below. Floor 802 is the fourth floor of the island complex for upper level personnel, visitors, dignitaries and the like. Floor 802 also includes two escape pods.

Escape pod 803 is representative of the escape pods located on each floor. Escape pod 803 is a structure or domicile ready for evacuation in the event of an emergency threatening the survival of the patrons of island 800. Such emergency situations may include hurricanes, typhoons, and the like, as well as other natural disasters, such as earthquakes. Escape pod 803 also may be used should island 800 come under attack, or the patrons believe that they must escape harm.

Escape pod 803 may be used as a domicile on the platform and be ready for launch or released in the event water submerges the appropriate level. Thus, even if the platform sinks, patrons may escape harm. Escape pod 803 includes its own power source and air, as well as guidance and propulsion systems.

Post, or column, 804 doubles as a lowering and raising mechanism as needed. Post 804 is configured in a telescopic arrangement that could also be used as a shock or cushion mechanism in rough seas. Post 804 may be lowered and raised by automatic hydraulic or computer-assisted adjustment. Post 804 also may enclose electrical, power and communication wires/cables for interaction and data exchange between floors.

Floor 805 is the second floor of the island complex reserved for island commerce facilities including retail, banking, recreation, sporting, eating and the like. Lines or cables 805a represent electrical or communication lines. Alternatively, lines 805a may represent plumbing or HVAC lines.

Floor 806 is the first floor, or the main platform, for island 800. Floor 806 provides general housing and visitor quarters. Sections of floor 806 also may be used for growing produce for the island population, visitors and the like as part of the self-sustaining aspects of the disclosed embodiments. Inside the main platform are the power generation and waste treatment facilities. Other features include public works such as desalination and fresh water supply for island 800. Floor 806 also acts as the main docking area for ships or attachment to bridges, other islands, and the like.

Vessel 807 is moored to island 800. A plurality of vessels and ships may be docked to island 800. Vessel 807 may dock in artificial harbor 807*a*. Connection 807*b* may connect vessel 807 to the power resources of island 800. Vessel 807 may receive the power collected by island 800. Mass transit links 808 may be located on either side of the platform of island 800. Each mass transit link 808 includes an entry and exit port to receive vehicles. For example, one link 808 may enter island 800, while the other link 808 exits.

Breaker 809 is an artificial breaker set up to buffer island 800 from rough seas. Breaker 809 also may include housing or facilities. Another breaker 809 may be constructed on the side of artificial harbor 807*a* opposite floor 806. Escape pod 810 may be an escape pod that also acts as a lighthouse.

Power generation and waste management room 811 includes facilities for generating power and managing waste. Power, communication and plumbing lines may connect room 811 with various points on island 800. At the center of room 811 is EMLPG 811*a*.

Telescopic post/shock absorber 812 raises or lowers the main platform, as well as buffers it through shock absorption in rough seas. It is supported by main ballast power generation and propulsion unit 814 set below the water line in FIG. 8. Absorber 812 does not necessarily need to be below the water line.

Within the tubes for mass transit links 808 are mass transit units 813. Mass transit unit 813 may resemble subway trains. Mass transit unit 813 is encased in the tube and includes magnets centering it and propelling it through the tube of link 808. While travelling, unit 813 is charged by particles by interacting with the tube and the tube walls collect these excess energy particles for energy transfer between island nodes. These principles are disclosed above.

Main ballast power generation and propulsion unit 814 stabilizes and moves island 800 through a combination of turbine propeller fan manipulation and water jet induction/expulsion. Unit 814 also may generate power for the island complex and connected island complex nodes.

Fan blade propulsion and energy collection device 815 also is shown on island 800. When being powered to move against waster, device 815 is in propulsion mode. When absorbing ocean current, it is in energy collection mode. The blades can collapse and fold out in various arrangements determined by a computer reading of the current thrust directions to maximize stabilization of the platform and maximize energy collection and propulsion. A mesh sleeve arrangement 815*a* lets water pass through but does not allow marine life within its confines. This feature protects the marine environment, as well as device 815.

Water jet intake or output channels 816 and 818 are used for ballast unit propulsion, stabilization or power generation. Channel 816 or 818 leads to a turbine. Then, the flow leads to the other channel out. When fan blade arrangement 815 needs power for propulsion, the turbine intake feeds power to the fan blade arrangement via a water turbine centered in the water intake/output area. When island 800 is idle and the fan blade arrangement is being used for current power collection, power is sent through the turbine apparatus to the appropriate points of island 800. The turbine apparatus, or turbine, is shown by turbine 817, having power cables leading to and from it. Turbine 817 also receives power from EMLPG 811*a* in the main platform to feed the fan blade propeller.

Tube 819 is a transit tube between breaker complex 809 and ballast unit 814. Fish 820 represents schools of fish or other marine life being raised as part of an aquaculture farm that surrounds island 800. Netting/mesh 821 keeps fish 820 within the confines of the aquaculture farm. A pinion mechanism 822 may extend to the ocean floor to stabilize island 800. This configuration may be permanent or detachable to allow island 800 to move using the propulsion mechanism. Alternatively, pinion mechanism 822 may be retractable.

Figure 9:
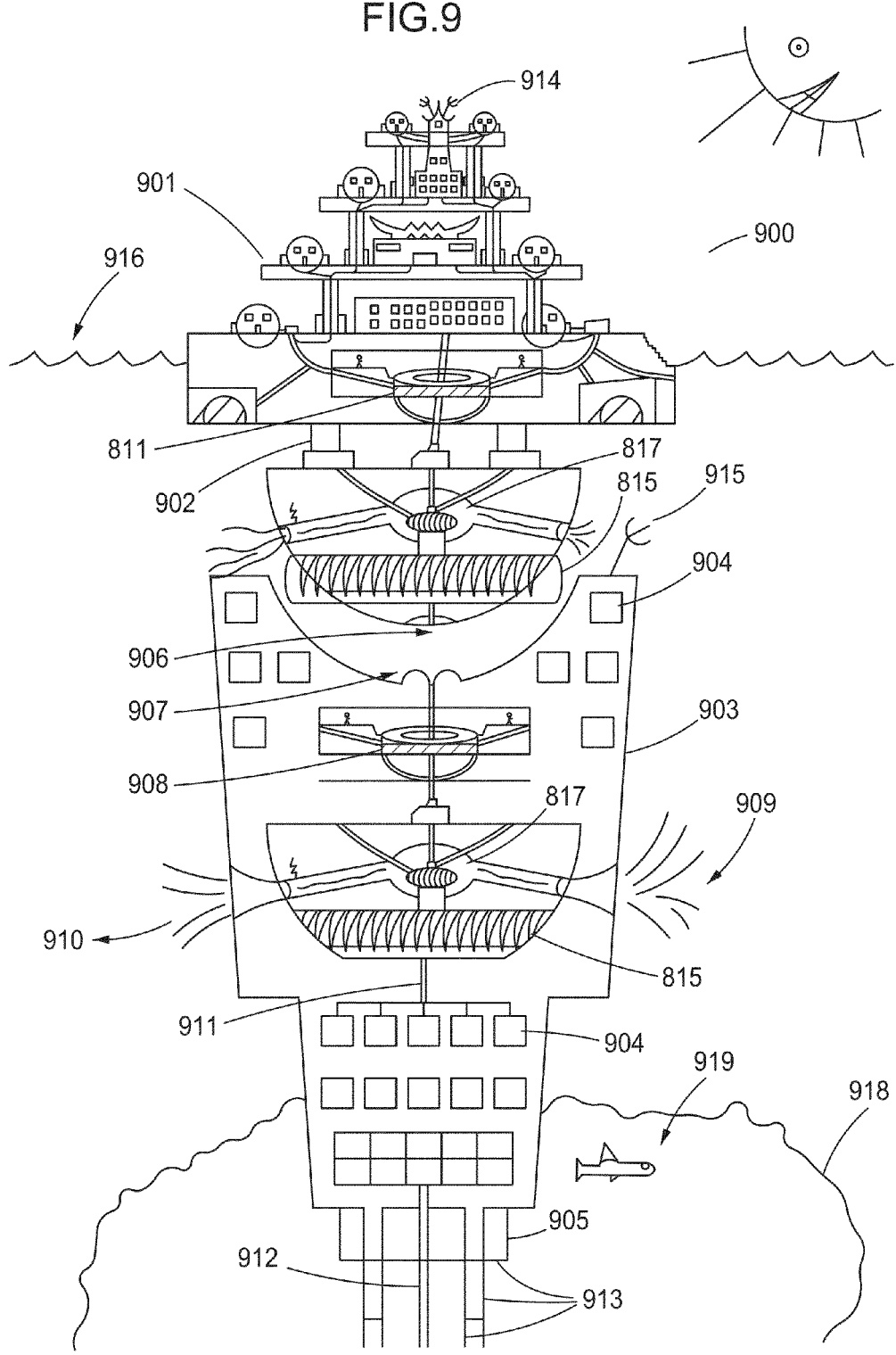
FIG. 9 illustrates another island according to the disclosed embodiments.

FIG. 9 depicts another island 900 having a power generation, docking and habitation pinion. Island 900 may include the features of island 800, and those aspects are not repeated. Detachable island 901 attaches or comes into close proximity of power pinion 903. Telescopic stabilization pinion 902 stabilizes the upper decks and is retractable for docking or departing power pinion 903.

Power pinion 903 includes the same power generation mechanism as disclosed for island 800. Power pinion 903 includes a habitat for people to reside and live as well as attend to the functions of the power pinion. Power pinion 903 generates power as disclosed above with the ECCAP configuration. Power pinion 903 also may be telescopic as it can rise above sea level of ocean 916. Window 904 may represent a dwelling or apartment in power pinion 903.

Neck 905 of power pinion 903 is telescopic and houses the power cable that runs to the ocean floor. Base 906 of island 901 includes an insertion or docking point for connecting with all the utilities apparatus of power pinion 903. Basic 907 of power pinion 903 includes, at its center, the insertion or docking point for connecting to island 901.

Power generation and waste management room 908 resembles room 811 of FIG. 8. Room 908 is configured to operate within power pinion 903, and has power, communication and plumbing lines running to and away from the insertion or docking point of basin 907 as well as away from the habitation units of power pinion 903 and down to the sea floor to connection with an island sea chain as well as land. Room 908 may include an EMLPG.

Water jet intake or output channels 909 and 910 resemble channels 816 and 818 shown in FIG. 8. Channels 909 and 910 lead to turbine 817. Turbine 817 within power pinion 903 functions like turbine 817 in FIG. 8. When fan blade propulsion and energy collection device 815 located in power pinion 903 needs power for propulsion, the intake for turbine 817 feeds power to fan blade arrangement 815 via the water turbine centered in the water intake/output area. Fan blade arrangement 815 is being used for current power collection. Power is transferred from there through the turbine apparatus though the docking basin 907 to the appropriate points on island 901. Power also may be transferred down to the habitation units and further to the sea floor to connect with the island chain and land, as disclosed in greater detail below. Turbine 817 also may receive power from the EMLPG located about it in power pinion 903.

Power and communication bundle line 911 transfers power from the power generation turbine to the ocean floor in order to connect with the island chain disclosed below. Line 911 also may connect with land network or power stations to supply power to land-based communities. Power and communication bundle line 912 leads away from the head of power pinion 903 through its neck and to the ocean floor to facilitate the connection to the island chain or land.

Annulus points 913 are configured into a telescopic arrangement. Preferably, there are three annulus points 913, but any number may be used. Annulus points 913 allow power pinion 903 to emerge about surface 916 of the water. Power pinion 903 may rise above surface 916 for receive direct deliveries from other islands or land, such as receiving helicopters. Further, it may rise for habitation or work purposes. When not receiving an island 901, power pinion 903 may rise. Annulus points 913 may lower power pinion 903 upon the onset of bad weather, or when needed for docking purposes.

Communication units 914 may be located on top of the highest point of island 901. Preferably, communication units 914 are dish-shaped, and at least two are used. Communications units 914 may provide wireless communications to other sites, such as land-based stations or other islands within the island chain. Such communications may include broadcasts or signals from satellite, radio, cellular (digital or analog), and the like.

Communications unit 915 may be located on power pinion 903. Although one communications unit 915 is shown, any number of units 915 may be placed on power pinion 903. Communications unit 915 also may be dish-shaped. When power pinion 903 is above surface 916, communications unit 915 may provide communications with land-based stations and other islands. Such communications may include broadcasts or signals from satellite, radio, cellular (digital or analog), and the like.

Mesh/netting 918 keep fish 919 within an area used for aquaculture farming. Fish 919 represents schools of fish or other marine life being raised as part of an aquaculture farm that surrounds power pinion 903.

Figure 10:
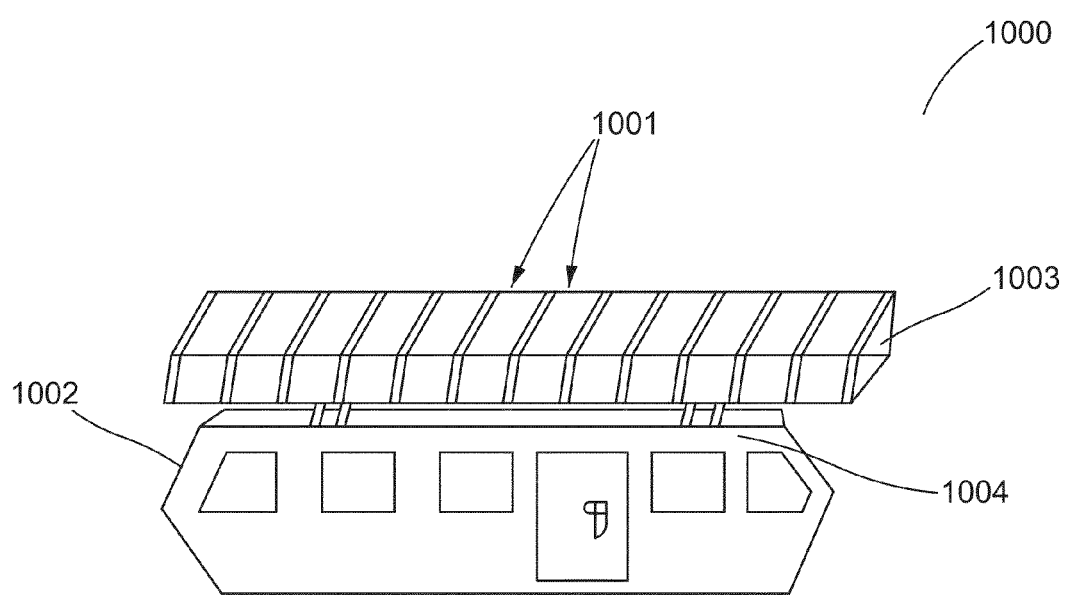
FIG. 10 illustrates an underwater segmental articulated suspension railway according to the disclosed embodiments.

FIG. 10 depicts an underwater segmental articulated suspension railway 1000 according to the disclosed embodiments. Railway 1000 may connect the various islands disclosed above, and land-based stations to carry passengers underwater to the islands or power pinions. Segmentation track 1001 are housed and suspended to allow the train to run through its suspension housing. The segmentation feature allows flexibility in the track with currents, tides. Segmentation of the track also allows it to absorb the weight of train car 1002 and relieve tension between the habitation units (islands, platforms, and the like).

Passenger car, or train car, 1002 travels along segmentation track 1001. Other cars may be used, such as storage, heated, frozen or other special environmental cases for the delivery of items, such as food. Train car 1002 also may be a plurality of cars.

Interior 1003 of the railway 1000 acts as a suction suspension portal, or pathway. Suspension arms 1004 run along the interior of the track holding train car 1002 with lateral swaying control arms between them to alter and absorb the sway of the train and track to maximize steadiness in travel by reducing the sway caused by the ocean environment.

Figure 11:
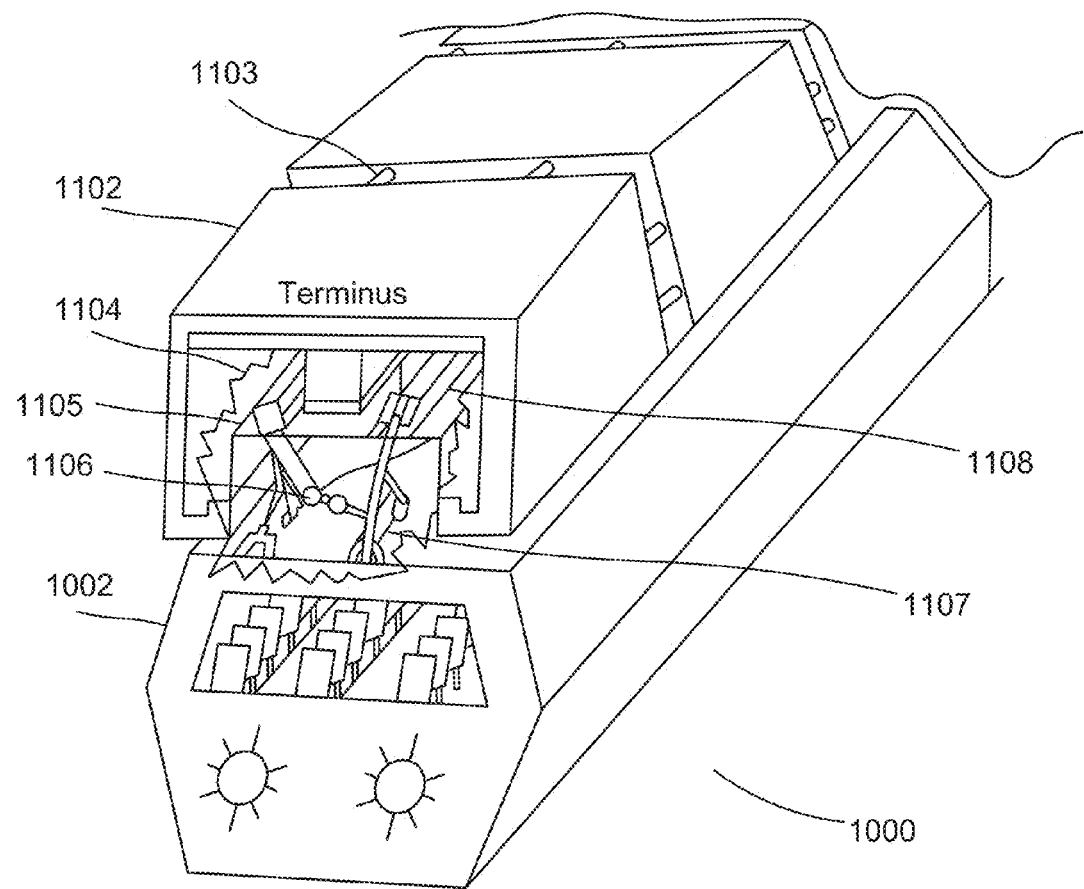
FIG. 11 illustrates a front view of the underwater segmental articulated suspension railway according to the disclosed embodiments.

FIG. 11 depicts a front view of underwater segmental articulated suspension railway 1000 according to the disclosed embodiments. Suspended train car 1002 travels along railway 1000 using blocks 1102 and tracks 1108 to direct movement of the train car. Suspension block 1102 comprise articulated suspension railway 1000. Flexible joints 1103 couple blocks 1102 together for articulation. Cavern 1104 houses track runners used in the disclosed embodiments. Cavern 1104 acts as a suction suspension pathway.

High pressure air or hydraulic spring and runner 1105 runs in the interior of cavern 1104. Spring and runner 1105 is engaged with the track run line that allows it to pass along tracks 1108. Lateral swaying control apparatus 1106 buffets and absorbs sway caused by the ocean environment for a smoother ride. Suspension arms 1107 are coupled to train car 1002 and connect with spring and runner 1105, which is engaged with the track 1108 within cavern 1104 to suspend the train car. Tracks 1108 engages bottom mounted wheels or a maglev arrangement of spring and runner 1105 to allow movement of train car 1002.

Figure 12:
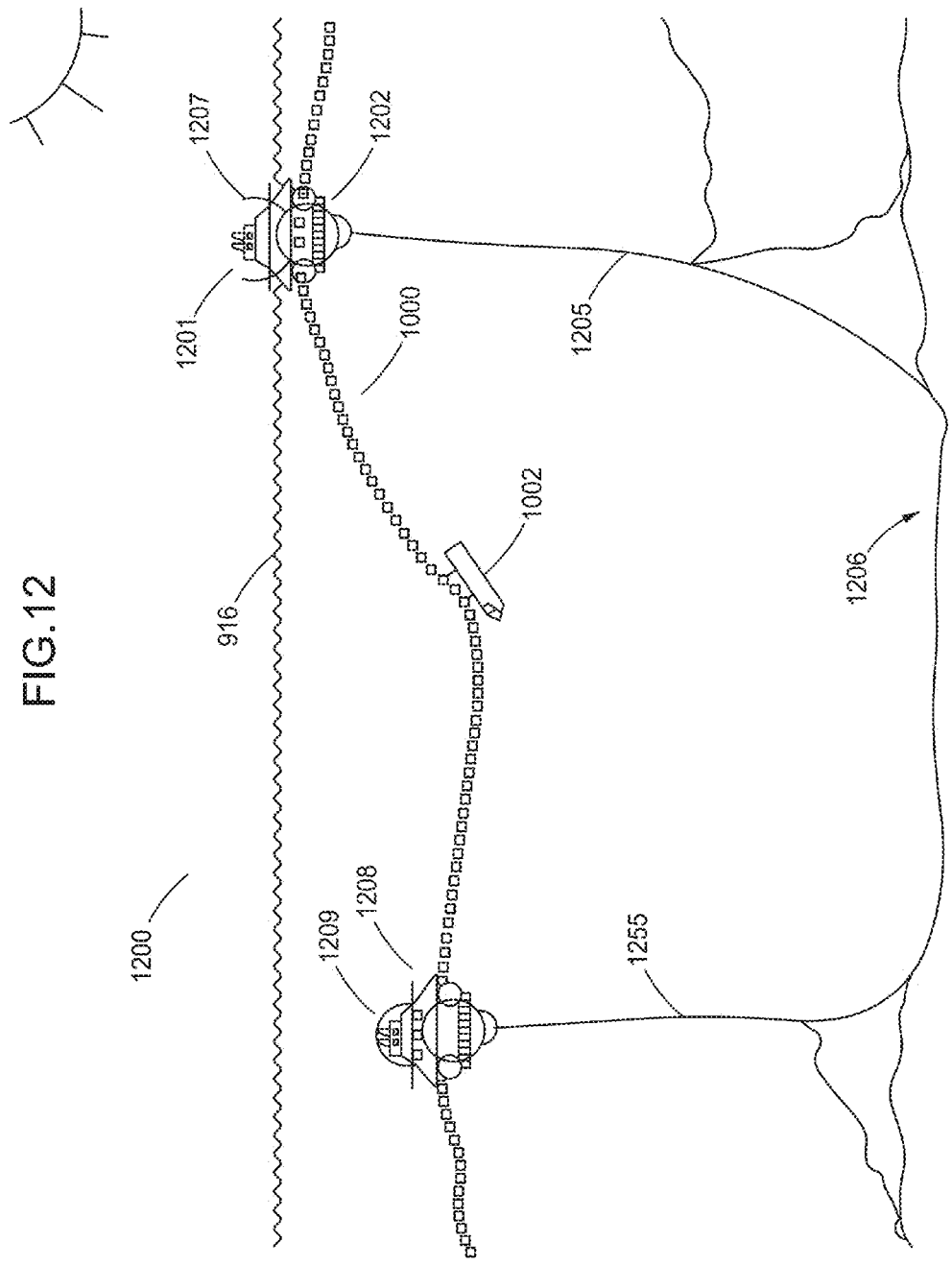
FIG. 12 illustrates a system using the underwater segmental articulated suspension railway according to the disclosed embodiments.

FIG. 12 depicts a system 1200 using underwater segmental articulated suspension railway 1000 according to the disclosed embodiments. System 1200 may connect various islands to each other to allow transportation and deliveries. System 1200 also may connect to land-based stations as well.

Island 1201 is a surfaced ECCAP MMHU Ecopolis island that maintains a stationary position with its turbine propulsion system so that its platform is above surface 916 of the aquatic environment. Island 1201 also runs cable 1205 for power and communications along sea floor 1206. Assembly 1202 represents the rotors or blades of the exterior turbine wheel using these blades to maintain the stationary position. Assembly 1202 is similar to the turbine assemblies disclosed above.

Dome 1207 is shown in a retracted state as island 1201 is above surface 916. An island may include domes to protect the island for environmental threats, and to allow the island to submerge underwater. Preferably, the domes are made of material compatible with an ocean environment.

Island 1208 refers to a submerged island to where train car 1002 is proceeding. Island 1208 also may be held in stationary location by cable 1255, and is connected to island 1201 by railway 1000. The segmented tracks allow for some movement between island locations. Dome 1209 is closed around the platforms of island 1208 to keep the surface platforms air tight. In this configuration, inhabitants may observe sea life and the underwater environment.

Figure 13:
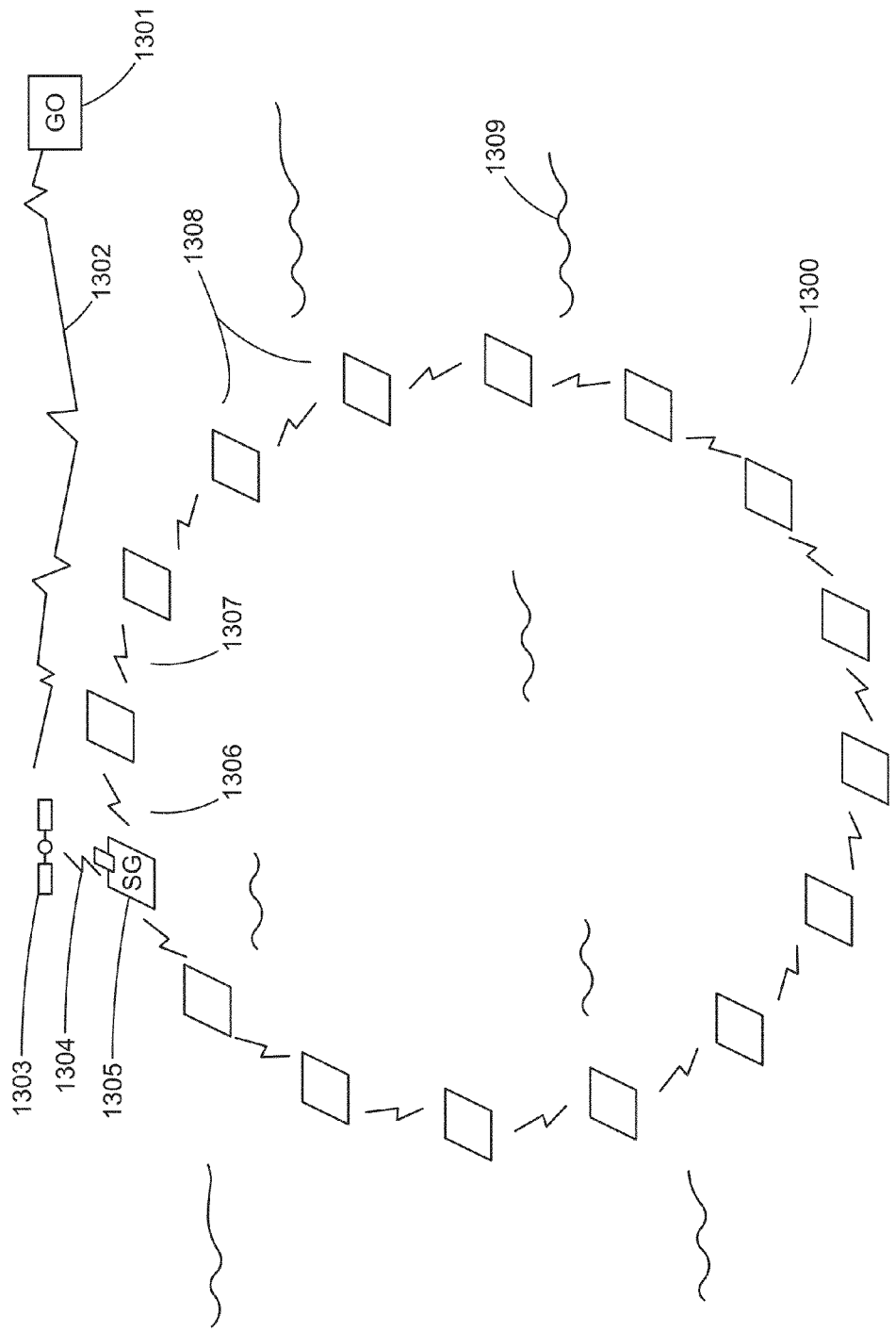
FIG. 13 illustrates a plurality of marine habitats, platform or islands according to the disclosed embodiments.

FIG. 13 depicts a plurality 1300 of marine habitats, platform or islands according to the disclosed embodiments. Gateway operator 1301 operates as a portal to send and receive signals or commands 1302 via a broadcast medium to a service gateway for each of the plurality of islands 1300. Gateway operator 1301 may located on land or at sea and preferably is fixed. Alternatively, gateway operator 1301 may be mobile and moves to different locations to interact with separate pluralities of islands.

The command 1302 may include instructions to form the circular formation 1308 shown in FIG. 13. Other formations 1308 may be configured by islands 1300. Preferably, each island uses its propulsion system, disclosed above, to maneuver into position.

Satellite 1303 receives a command from gateway operator 1301 and relays the command as signal 1304 to each service gateway 1305 on each of the plurality of islands 1300. In an embodiment, service gateway 1305 may be located on the nearest island to satellite 1303 for receipt of signal 1304. Service gateway 1305, therefore, may be referred to as the "commanding" service gateway, and sends signal 1306 to the island closest to it or according to a pattern. As shown in FIG. 13, the pattern may be clockwise to the next island. Signal 1307 is the signal from this next island to another island according to the pattern. Signals may be sent to each island until a confirmation signal is received by at commanding service gateway 1305. Waves 1309 represent the aquatic environment of islands 1300.

Figure 14:
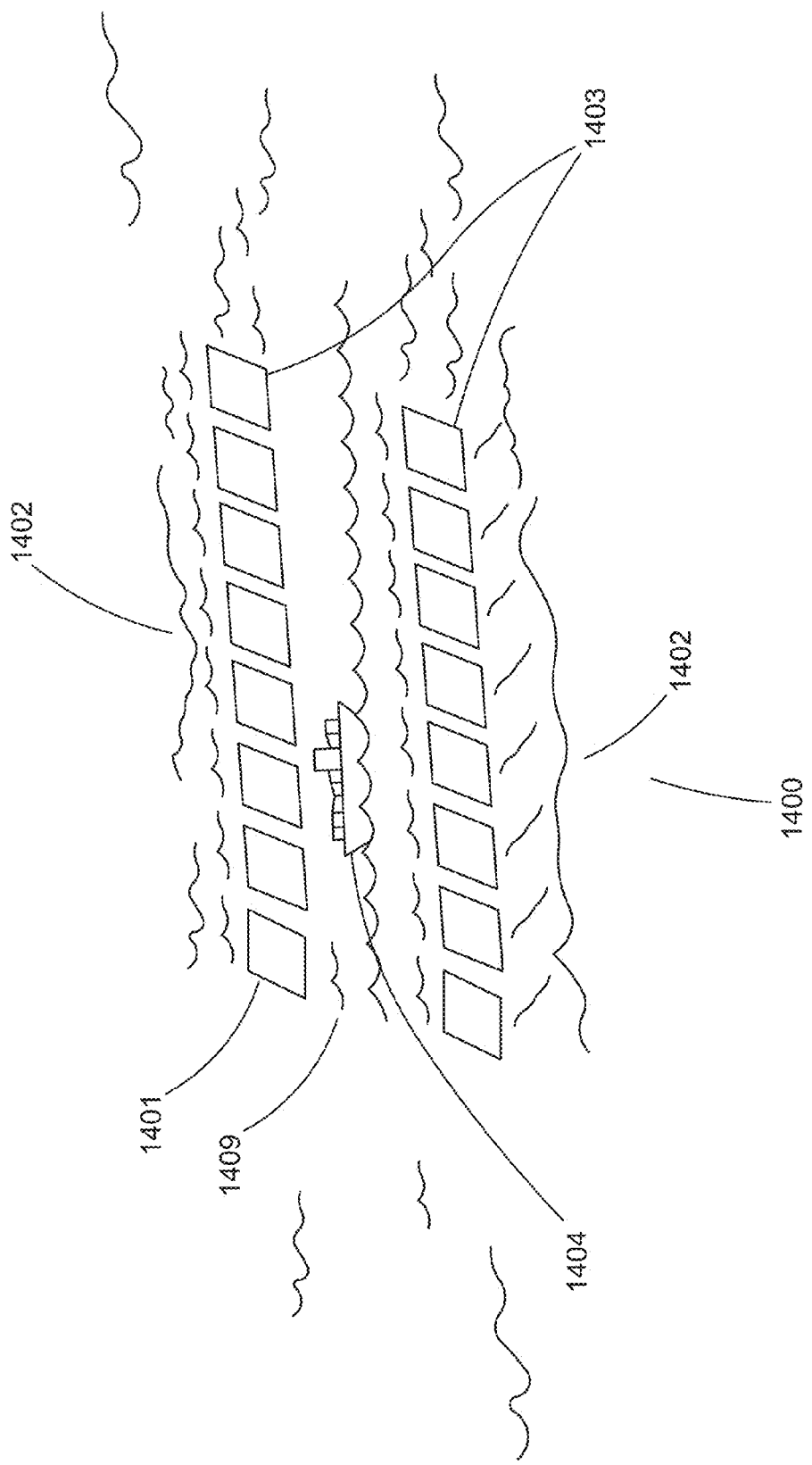
FIG. 14 illustrates another plurality of marine habitats, platform or islands according to the disclosed embodiments.

FIG. 14 depicts another plurality 1400 of marine habitats, platform or islands according to the disclosed embodiments. Islands 1400 may form a rectangular configuration. Referring back to FIG. 13, each island may receive a command from gateway operator 1301 to maneuver into position. Island 1401 may be an island created from converted material and having the configuration and infrastructure disclosed above.

Seas 1402 may be choppy or not safe for travel, or to have island 1401 to be alone. The formation provides protection to each individual island. Rows 1403 are aligned with islands to for a canal 1409. Canal 1409 allows for passages of sea-going vessels, shown as ship 1404. Canal 1409 preferably is a safe passage that provides smoother ride by buffeting the waves of seas 1402. In this embodiment, each island 1401 turns its buffer structure 809 to the open seas to stand against the waves.

Figure 15:
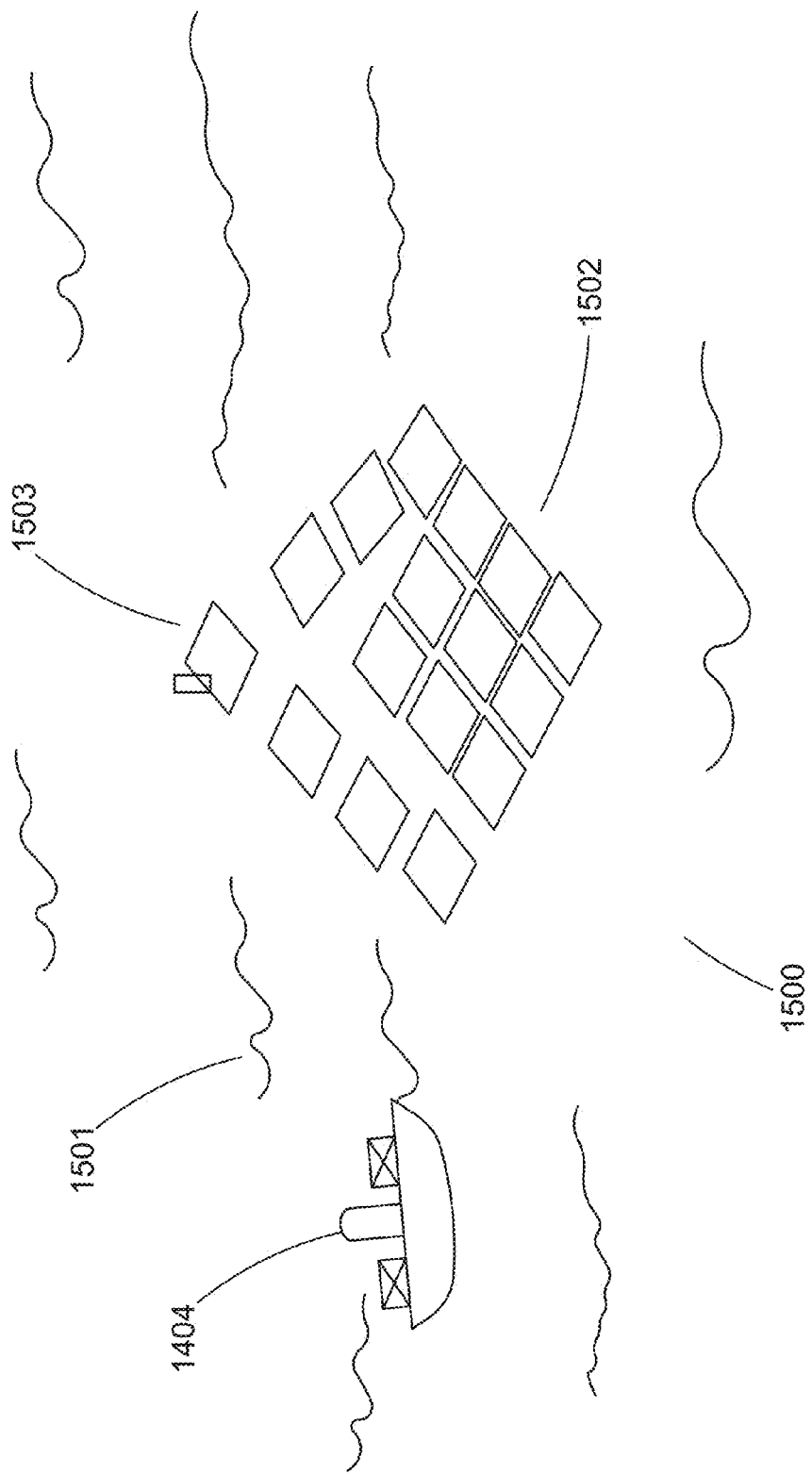
FIG. 15 illustrates another plurality of marine habitats, platform or islands according to the disclosed embodiments.

FIG. 15 illustrates another plurality 1500 of marine habitats, platform or islands according to the disclosed embodiments. Islands 1500 form a square configuration to create one large island structure to meet or dock with vessel 1404. Seas 1501 may be calm, or at least not as active as seas 1402 disclosed above. Formation 1502 comes together as commanded by a gateway operator 1301, or other means. Formation 1502 may be advantageous to meet with and interact with the crew and passengers of vessel 1404. Formation control unit 1503 fits last into place to complete formation 1502.

Figure 16:
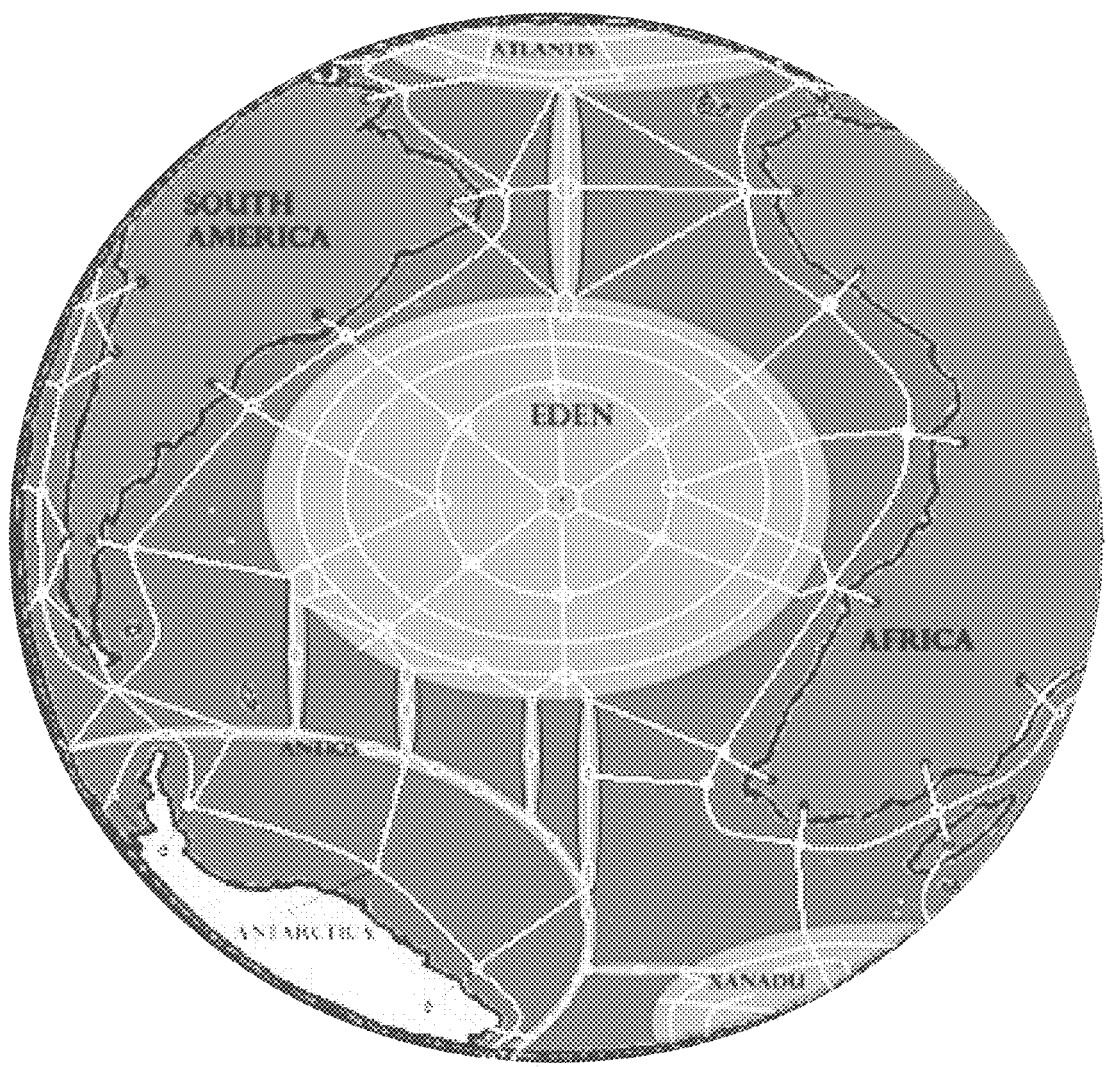
FIG. 16 illustrates chains of islands or pluralities of islands that form gyre hubs according to the disclosed embodiments.

FIG. 16 depicts chains of islands or pluralities of islands that form gyre hubs according to the disclosed embodiments. Gyre hubs may be situated around a particular gyre within the oceans to take advantage of the tidal forces within the gyre. Further, gyre hubs provide a sense of community among the islands and allow the inhabitants to unite for common objectives. Power and resources also may be shared within the gyre hubs between the islands.

"Eden" may refer to gyre hub 1600. Eden 1600 is a collection of islands and platforms located in the South Atlantic Ocean. A bridge chain 1601 may be a group of islands that connect Eden 1600 to Atlantis 1602, which is a separate gyre hub located in the North Atlantic Ocean. As can be appreciated, issues and concerns may differ between citizens in the South Atlantic and the citizens in the North Atlantic. Thus, even though connected by bridge chain 1601, these gyre hubs may be separate entities.

Bridges also may connect the gyre hubs with continental locations. Thus, a chain of islands may connect to South America and Africa from Eden 1600. Other gyre hubs may be created, as shown. In the case of Antios 1604, the islands form a chain around Antarctica.

Figure 17:
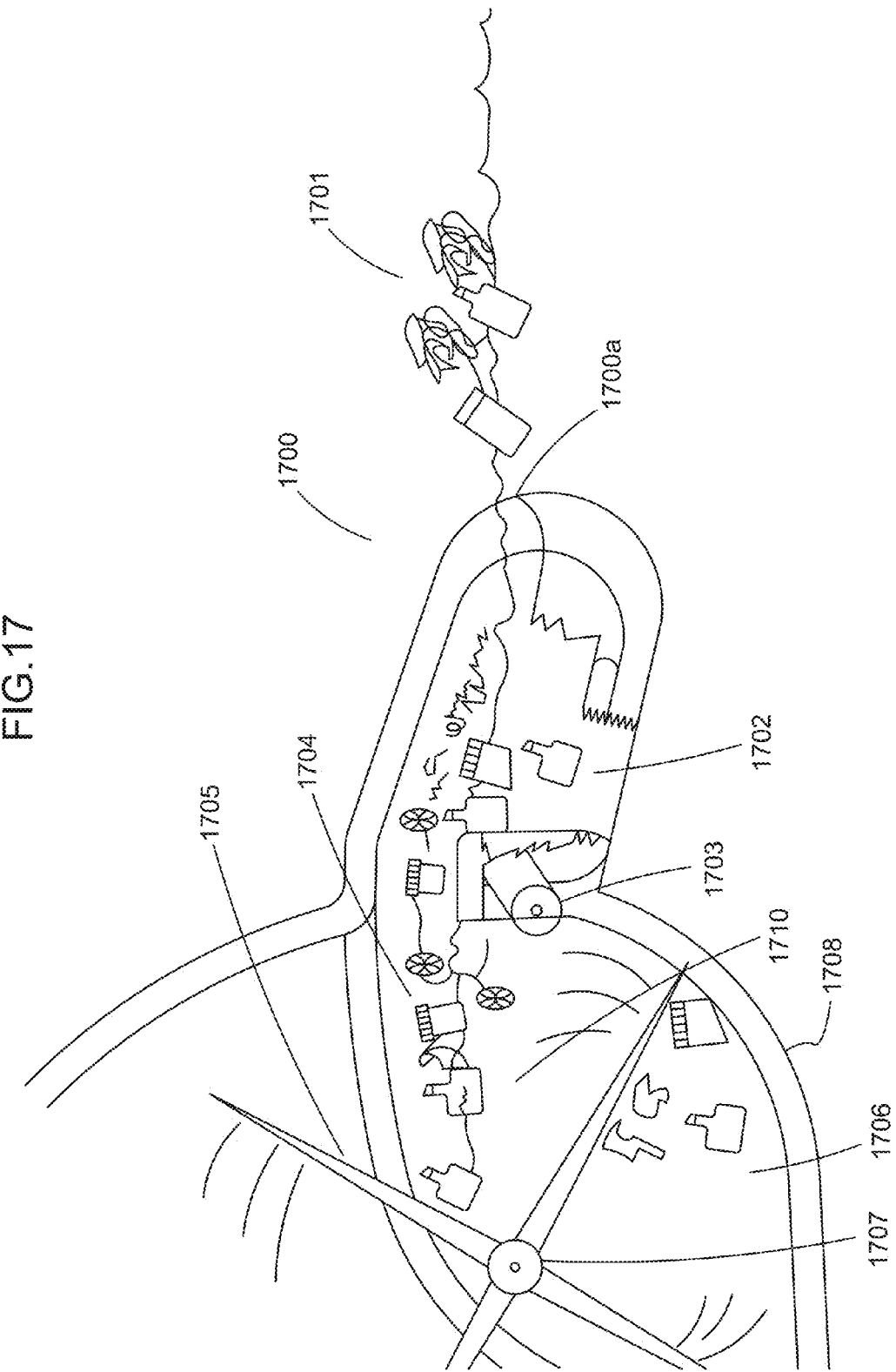
FIG. 17 illustrates an intake chute and assembly to convert garbage and debris into building material according to the disclosed embodiments.
Figure 18:
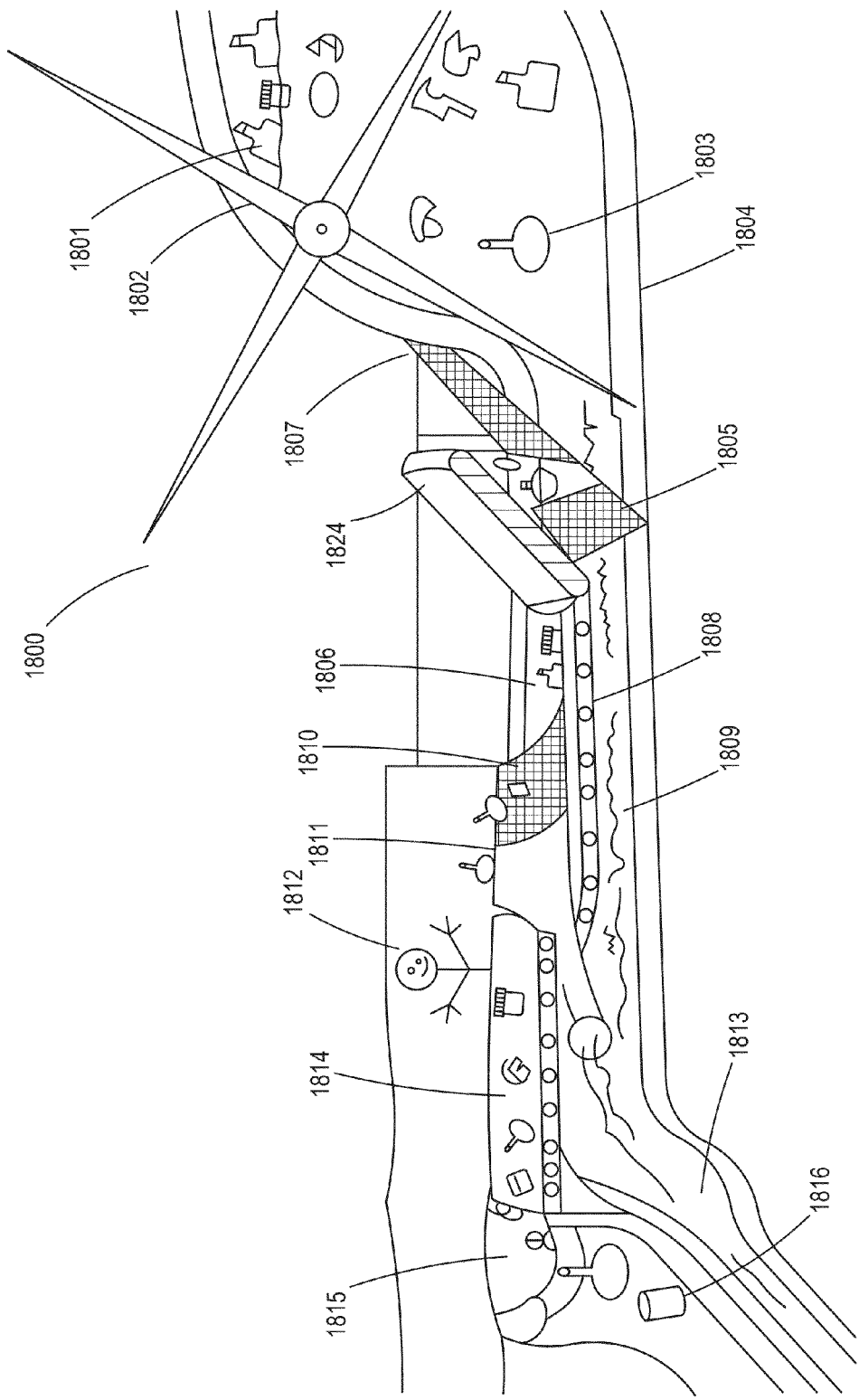
FIG. 18 illustrates a separation chamber for the assembly to convert garbage and debris into building material according to the disclosed embodiments.

FIG. 17 illustrates an intake chute and assembly to convert garbage and debris into building material according to the disclosed embodiments. FIG. 18 illustrates a separation chamber for the assembly to convert garbage and debris into building material according to the disclosed embodiments. These figures are discussed in conjunction with each other for easier understanding.

The assembly shown in FIGS. 17 and 18 may be used to execute the processes and features disclosed in FIGS. 1-3. Further, the assembly may reside on a water habitat platform as discloses. Within the assembly, the intake chute lowers its outer lip below the water level to a depth sufficient to collect floating debris. This action may be performed while an island or platform is moving against, toward or through a mass of floating debris and garbage with the force of the water against the hull, pushing the water and debris towards it.

The intake chute takes in the water and debris to separate the debris from the water with a fan blade pushing the debris towards a separation chamber and conveyor belt. The water is separated by a series of pipes running off the separation chamber. The separation chamber may have a water intake opening with mesh or grid covering to prevent the debris from entering the water output pipes. The debris is sent down the conveyor belt and then down a dry chute to be separated for processing or recycling.

Referring to FIGS. 17 and 18, debris 1701 floats on the water towards the mouth 1700a opening of intake chute 1700. Debris 1702 is trash and garbage within the mouth 1700a of intake chute 1700. Pinion 1703 allows intake chute 1700 to be lowered and raised into the water. Debris 1704 is trash and garbage heading into intake chamber 1710 to be pushed by the fan blades disclosed below.

Fan blade 1705 rotates within intake chamber 1710 to move debris 1704. Fan blade 1706 pushes debris 1704 towards the separation channels. Pinion 1707 may provide the axis for the fan blades to rotate around. Hull 1708 protects the assembly from damage from the aquatic environment and keeps sea life out of harm's way and the fan blades.

Separated debris 1801 proceeds into separation chamber 1800. Fan blade 1802 pushes debris 1801 to the separation chamber. Fan blade 1802 may refer to fan blades 1705 and 1706 of FIG. 17. Debris 1803 is the rubbish propelled towards the separation chamber. Hull 1804 encloses the assembly, much like hull 1708 disclosed above.

Grate 1805 covers the entrance of a pipe leading into separation chamber 1800. Grate 1805 allows water to pass through but not rubbish. Area 1806 receives the rubbish (debris 1803). Fan blade 1807 propels the rubbish up a separation chute ramp 1824. Due to its height above grate 1805, separation chute ramp 1824 does not allow water to enter. Conveyor belt 1808 includes a grid-like mesh that further separates the rubbish from water as it propels the rubbish forward. Conveyor belt 1808 allows water to seep through its mesh as it rises in elevation above the water level.

Water 1809 is the water being redirected down a pipe and eventually pumped back to the sea.

Lip 1810 is the lip of the ramp which takes the rubbish upwards within separation chamber 1800. Debris, or rubbish, 1811 is the trash that has reached lip 1810 and is about to go a conveyor belt to a drop chute for separation. A worker 1812 may oversee the operation. Water 1813 is water separated from the trash during this process and redirected out to the sea.

Conveyor belt 1814 moves the separated rubbish to drop chute 1816. Mouth 1815 of drop chute 1816 may further separate the rubbish by catching large items of trash to be taken elsewhere for processing or to be broken down into smaller pieces. Debris goes into drop chute 1816 for another separation chamber configured like separation chamber 1800, recycling facilities, conversion facilities, and the like.

Figure 19:
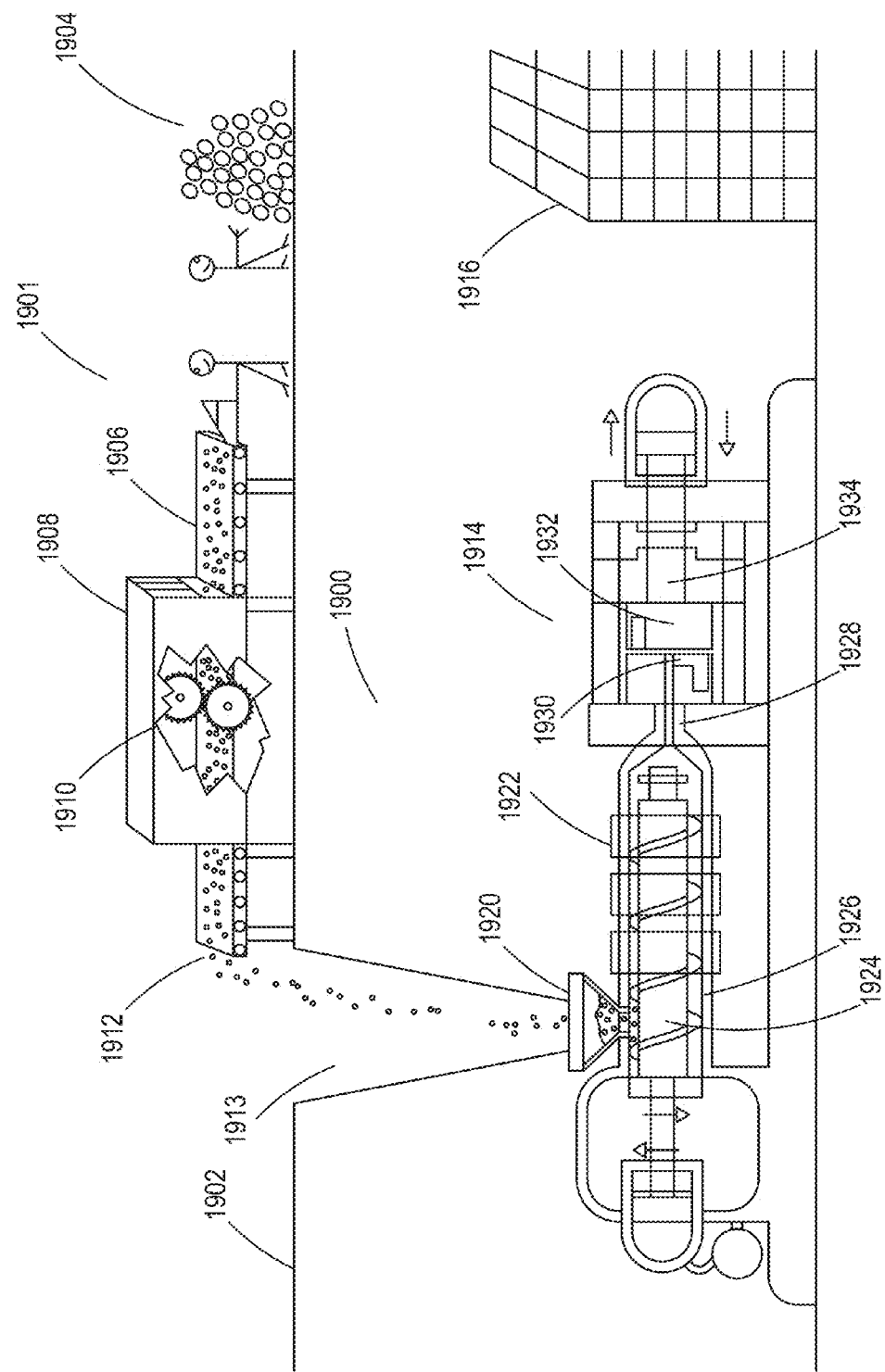
FIG. 19 depicts a system for converting the separated rubbish into building materials according to the disclosed embodiments.

FIG. 19 depicts a system 1900 for converting the separated rubbish into building materials 1916 according to the disclosed embodiments. System 1900 includes a recycling process assembly 1901 located on a habitat vessel deck 1902. Raw material 1904 is the separated rubbish generated by the assemblies disclosed in FIGS. 17 and 18. Preferably, raw material includes plastics along with other items. Raw material 1904 is placed on conveyor belt 1906 to move into a grinder 1908. Grinder 1908 may heat raw material 1904, or perform other actions, along with grinding the materials into smaller particles using grinder 1910.

Grinded materials 1912 continue moving along conveyor belt 1906 and into chute 1913. Chute 1913 may connect deck 1902 with a lower level within the water habitat platform. Grinded materials 1912 are received by injection molding machine 1914. Injection molding machine 1914 includes hopper 1920 to receive grinded materials 1912. Reciprocating screw 1924 turns within barrel 1926 to further refine the materials, and to move them along to heater 1922. Heater 1922 may heat the materials to a set temperature, preferably a melting point. The melted material then flows through nozzle 1928 into mold cavity 1930. The material collects in cavity 1930 until the cavity is full. Then, the material is placed into mold 1932 having a desired shape for building materials 1916. Preferably, the shape is a block. Movable platen 1934 may move the molded material out of injection molding machine 1914 to a stack of materials ready to use for building.

Thus, the disclosed embodiments includes processes for taking trash and materials located in the gyres of the world's oceans and converting this material into useful building blocks, that may then be used to create platforms for use in an aquatic setting. Although the above-description has referenced an oceanic environment, the disclosed embodiments also may be used in a fresh water environment such as a lake, or river.

The disclosed embodiments also include islands and units that float on the water, submerge underneath the water or stay fixed in a location. These islands also may form a chain of islands coupled together to share power and resources. Each island includes assemblies to generate power using tidal forces. Further, maglev forces may be used as well to collect particles for energy and to facilitate transportation between the islands.

It will be apparent to those skilled in the art that various modifications and variations can be made in the disclosed platforms and assemblies without departing from the spirit or scope of the invention. Thus, it is intended that the present invention covers these modifications and variations disclosed above provided that such modifications and variations come within the scope of any claims and their equivalents.

The invention claimed is:

1. A process for creating a water habitat platform comprising:
   collecting raw materials within an aquatic environment via an intake chute;
   pushing the raw materials towards a separation chamber;
   collecting the raw materials within the separation chamber;
   moving the raw materials on a separation chute ramp out of water brought from the aquatic environment;
   converting the raw materials into building materials;
   building a platform using the building materials; and
   launching the platform into the aquatic environment.

2. The process of claim 1, further comprising grinding the raw materials into pieces used for the building materials.

3. The process of claim 2, further comprising melting the pieces of the raw materials.

4. The process of claim 3, further comprising placing the melted pieces into a mold to create the building materials.

5. The process of claim 1, further comprising separating plastic material from the raw materials to use as the building materials.

6. The process of claim 1, wherein the building materials are a plurality of blocks.

* * * * *